(12) United States Patent
Yang et al.

(10) Patent No.: US 12,541,442 B2
(45) Date of Patent: Feb. 3, 2026

(54) CONSENSUS PROCESSING METHOD AND APPARATUS FOR BLOCKCHAIN NETWORK

(71) Applicant: Tencent Technology (Shenzhen) Company Limited, Guangdong (CN)

(72) Inventors: Wenhui Yang, Guangdong (CN); Zhichao Du, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 204 days.

(21) Appl. No.: 18/239,843

(22) Filed: Aug. 30, 2023

(65) Prior Publication Data

US 2023/0409450 A1     Dec. 21, 2023

Related U.S. Application Data

(63) Continuation of application No. PCT/CN2022/132238, filed on Nov. 16, 2022.

(30) Foreign Application Priority Data

Mar. 24, 2022 (CN) ........................ 202210302668.6

(51) Int. Cl.
    *G06F 11/20*      (2006.01)
(52) U.S. Cl.
    CPC ...... *G06F 11/2046* (2013.01); *G06F 2201/88* (2013.01)
(58) Field of Classification Search
    CPC ............. G06F 11/2046; G06F 2201/88; G06F 11/0793; G06F 2201/81; G06F 11/07;
(Continued)

(56) References Cited

U.S. PATENT DOCUMENTS 11,424,938 B1 * 8/2022 Meehan ................ H04L 9/3263
2019/0075022 A1    3/2019 Anderson et al.
(Continued)

FOREIGN PATENT DOCUMENTS

CN     106878071     6/2017
CN     107577694     1/2018
(Continued)

OTHER PUBLICATIONS

English-language Search Report issued in European Application No. 22933107.9 dated Feb. 11, 2025, (9 pages).
(Continued)

*Primary Examiner* — Meng Vang
(74) *Attorney, Agent, or Firm* — Crowell & Moring LLP

(57) ABSTRACT

A consensus processing method and apparatus are provided. The method includes: obtaining a type of the consensus algorithm currently running in the blockchain network, the type of the consensus algorithm comprising a first type and a second type; performing consensus environment detection on the blockchain network to obtain a detection result in response to the blockchain network satisfying a consensus environment detection condition, the detection result indicating whether an error occurs during consensus processing of the message by the at least some nodes based on the consensus algorithm; switching the consensus algorithm currently running in the blockchain network to a consensus algorithm of another type in response to the detection result satisfying a consensus algorithm switching condition corresponding to the type of the consensus algorithm.

18 Claims, 13 Drawing Sheets

Obtain a type of a consensus algorithm currently running in a blockchain network — 401A Perform consensus environment detection on the blockchain network to obtain a detection result in response to the blockchain network satisfying a consensus environment detection condition — 402A Switch the consensus algorithm currently running in the blockchain network to a consensus algorithm of another type in response to the detection result satisfying a consensus algorithm switching condition corresponding to the type — 403A

(58) Field of Classification Search
CPC . H04L 9/3239; H04L 9/50; H04L 9/40; H04L 41/142; H04L 43/0817; H04L 43/50; H04L 67/10; H04L 63/1441; Y02D 10/00
See application file for complete search history.

(56) References Cited

U.S. PATENT DOCUMENTS

| | | | |
|---|---|---|---|
| 2019/0235946 A1 | 8/2019 | Guo et al. | |
| 2020/0112443 A1 | 4/2020 | Todd | |
| 2020/0192770 A1* | 6/2020 | Walid | H04L 9/3247 |
| 2020/0250374 A1* | 8/2020 | Huang | H04L 9/0637 |

FOREIGN PATENT DOCUMENTS

| | | | | |
|---|---|---|---|---|
| CN | 108235799 | | 6/2018 | |
| CN | 110598471 | | 12/2019 | |
| CN | 111464356 | | 7/2020 | |
| CN | 112564960 | | 3/2021 | |
| CN | 113764060 | | 12/2021 | |
| CN | 115834590 A * | | 3/2023 | ........... H04L 9/3239 |
| EP | 3236403 A2 * | | 10/2017 | ........... G06Q 20/388 |
| EP | 3605947 A1 * | | 2/2020 | ......... H04L 67/1097 |

OTHER PUBLICATIONS

International Search Report issued Feb. 14, 2023 in International (PCT) Application No. PCT/CN2022/132238.

* cited by examiner

CONSENSUS PROCESSING METHOD AND APPARATUS FOR BLOCKCHAIN NETWORK

RELATED APPLICATION

This application is a continuation application of PCT Patent Application No. PCT/CN2022/132238, filed on Nov. 16, 2022, which claims priority to Chinese Patent Application No. 202210302668.6, filed with the China National Intellectual Property Administration on Mar. 24, 2022, wherein the content of the above-referenced applications is incorporated herein by reference in its entirety.

FIELD OF THE TECHNOLOGY

This disclosure relates to the technical field of blockchain, and in particular, to a consensus processing method and apparatus for a blockchain network, a device, a storage medium, and a program product.

BACKGROUND OF THE DISCLOSURE

In the related art, a consensus algorithm currently used in a blockchain network focuses on efficiency of reaching a consensus, but has limited fault tolerance performance for node abnormities, or merely focus on fault tolerance performance in a consensus reaching process. The fault tolerance performance is used for ensuring that most nodes can still reach a consensus even if there is a faulty node or a malicious node. In the related art, the consensus algorithm in the blockchain network has low switching flexibility, which affects the fault tolerance performance of the blockchain network.

SUMMARY

This disclosure provides a consensus processing method and apparatus for a blockchain network, a device, a storage medium, and a program product, which can improve fault tolerance performance of the blockchain network.

Technical solutions in the embodiments of this disclosure are implemented as follows:

In an aspect, this disclosure provides a consensus processing method for a blockchain network, which is performed by an electronic device. The electronic device runs a plurality of nodes included in the blockchain network. At least some of the plurality of nodes are configured to perform consensus processing on a message transmitted by a client based on a consensus algorithm.

The method includes:
  obtaining a type of the consensus algorithm currently running in the blockchain network, the type of the consensus algorithm comprising a first type and a second type, consensus performance of a consensus algorithm of the first type being greater than consensus performance of a consensus algorithm of the second type, and fault tolerance performance of the consensus algorithm of the second type being greater than fault tolerance performance of the consensus algorithm of the first type;
  performing consensus environment detection on the blockchain network to obtain a detection result in response to the blockchain network satisfying a consensus environment detection condition, the detection result indicating whether an error occurs during consensus processing of the message by the at least some nodes based on the consensus algorithm;
  switching the consensus algorithm currently running in the blockchain network to a consensus algorithm of another type in response to the detection result satisfying a consensus algorithm switching condition corresponding to the type of the consensus algorithm.

In another aspect, this disclosure provides a consensus processing method for a blockchain network. The blockchain network comprises a plurality of nodes, and at least some of the plurality of nodes are configured to perform consensus processing on a message transmitted by a client based on a consensus algorithm.

The method includes:
  determining a block generation speed of the blockchain network in at least one historical detection cycle;
  determining a target speed range where the block generation speed is located from a plurality of speed ranges, endpoint speeds of the plurality of speed ranges being linked with each other in sequence; and
  controlling the block generation speed of the blockchain network in a current detection cycle based on a speed control manner corresponding to the target speed range, a different speed range corresponding to a different speed control manner.

In another aspect, this disclosure provides a consensus processing apparatus for a blockchain network. The blockchain network includes a plurality of nodes. At least some of the plurality of nodes are configured to perform consensus processing on a message transmitted by a client based on a consensus algorithm. The apparatus includes: a memory operable to store computer-readable instructions and a processor circuitry operable to read the computer-readable instructions. When executing the computer-readable instructions, the processor circuitry is configured to:
  obtain a type of the consensus algorithm currently running in the blockchain network, the type of the consensus algorithm comprising a first type and a second type, consensus performance of a consensus algorithm of the first type being greater than consensus performance of a consensus algorithm of the second type, and fault tolerance performance of the consensus algorithm of the second type being greater than fault tolerance performance of the consensus algorithm of the first type;
  perform consensus environment detection on the blockchain network to obtain a detection result in response to the blockchain network satisfying a consensus environment detection condition, the detection result indicating whether an error occurs during consensus processing of the message by the at least some nodes based on the consensus algorithm;
  switch the consensus algorithm currently running in the blockchain network to a consensus algorithm of another type in response to the detection result satisfying a consensus algorithm switching condition corresponding to the type of the consensus algorithm.

In another aspect, this disclosure provides a non-transitory computer-readable storage medium, storing executable instructions. When the executable instructions are executed are executed by a processor, the consensus processing method for blockchain network provided in the embodiments of this disclosure is implemented.

In another aspect, this disclosure provides a computer program product, including a computer program or instructions. When the computer program or the instructions are executed by a processor, the consensus processing method for blockchain network provided in the embodiments of this disclosure is implemented.

The embodiments of this disclosure have the following beneficial effects:

When the consensus environment detection condition is satisfied, the consensus algorithm of the blockchain network is switched based on the switching condition corresponding to the consensus detection result and the consensus algorithm, which realizes more flexible consensus algorithm switching for the blockchain network, so that the consensus algorithm can satisfy a fault tolerance requirement of the blockchain network more effectively, thereby improving a fault tolerance capability and operation stability of the blockchain network. Furthermore, the blockchain network can adaptively switch the consensus algorithm based on a change of a service scenario, thereby satisfying requirements of different application scenarios.

DESCRIPTION OF EMBODIMENTS

Figure 1:
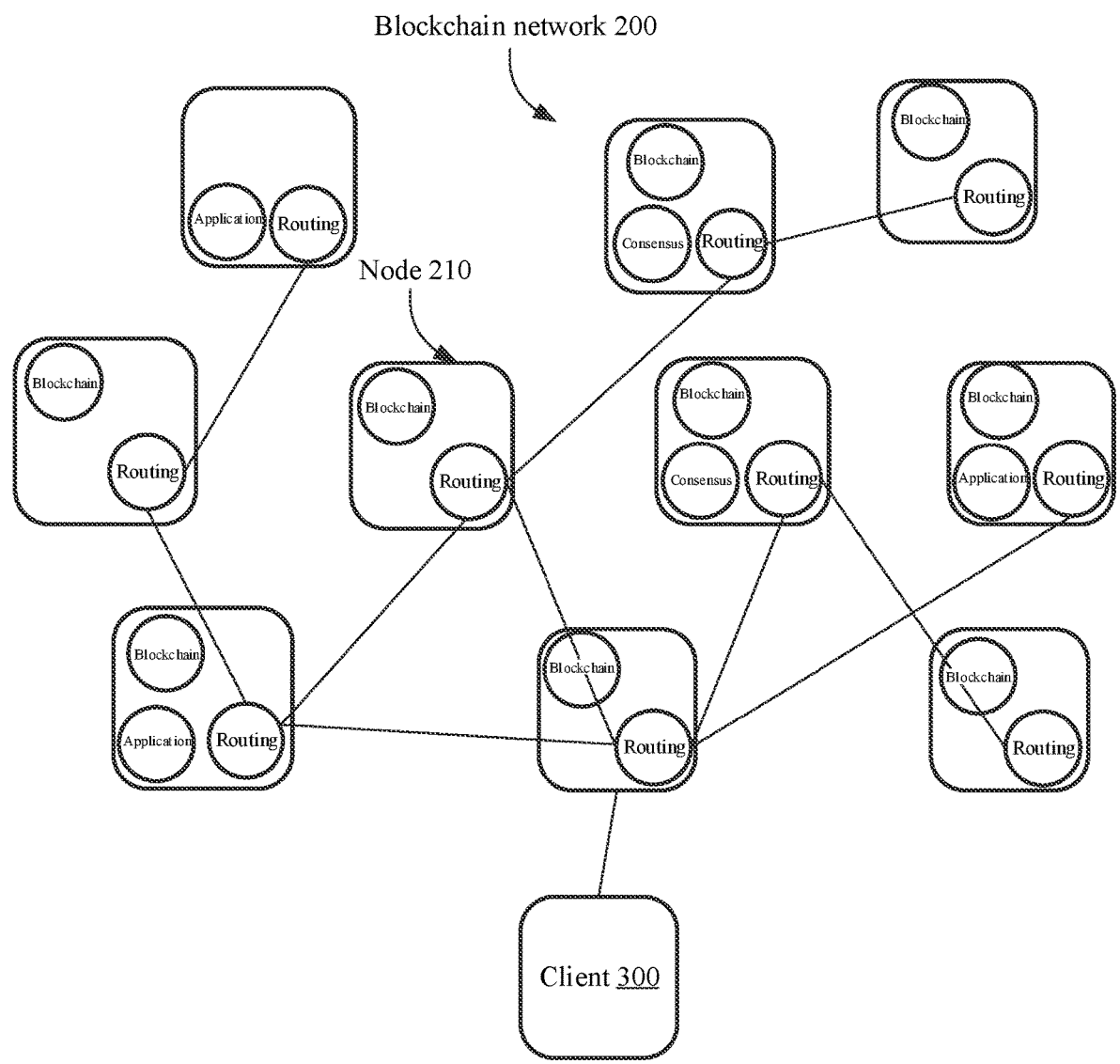
FIG. 1 is a schematic diagram of an application scenario of a blockchain network according to an embodiment of this disclosure.

In order to make objectives, technical solutions, and advantages of this disclosure clearer, this disclosure is described in further detail with reference to the drawings. The described embodiments are not to be construed as a limitation on this disclosure. All other embodiments obtained by a person of ordinary skill in the art without creative efforts fall within the protection scope of this disclosure.

In the following description, a term "some embodiments" describes subsets of all possible embodiments, but it may be understood that "some embodiments" may be the same subset or different subsets of all of the possible embodiments, and may be combined with each other without conflict.

In the following description, a term "first/second/third" is merely used for distinguishing between similar objects and does not represent a specific order of objects. It may be understood that "first/second/third" may be transposed in a specific order or a sequence if allowed, so that the embodiments described herein can be implemented in an order other than those illustrated or described herein.

The embodiments of this disclosure include relevant data such as user information and data fed back by users. When the embodiments of this disclosure are applied to specific products or technologies, user permission or consent needs to be obtained, and collection, use, and processing of the relevant data need to comply with relevant laws, regulations, and standards of relevant countries and regions.

Unless otherwise defined, meanings of all technical and scientific terms used in this specification are the same as those usually understood by a person skilled in the art of this disclosure. Terms used herein are merely intended to describe objectives of the embodiments of this disclosure, and are not intended to limit this disclosure.

Before the embodiments of this disclosure are described in further detail, on nouns and terms in the embodiments of this disclosure are described, and the following explanations are applicable to the nouns and terms in the embodiments of this disclosure.

1) Blockchain network: It is a system formed by a plurality of nodes connected through network communication. The blockchain network may further include a client. Specific content of a message in the blockchain network varies according to an actual service scenario. For example, the message may be a message log, an instruction to be executed by a state machine of a node, or the like.

2) Consensus: In the blockchain network, a node verifies correctness of a message sent by another node, and sends a confirmation to the node sending the message if the verification succeeds, and persistently stores the message to support subsequent message querying. Mechanisms for realizing a consensus include a proof of work (PoW), a proof of stake (PoS), a delegated proof of stake (DPoS), a proof of elapsed time (PoET), and the like.

For example, in the blockchain network, when a node successfully verifies effectiveness of a new block submitted by another node, the node sends a confirmation to the node sending the new block, and adds the new block to a tail of a blockchain stored in the corresponding node.

3) Crash error (fault tolerance): It is an error type indicating abnormal operation of a node caused by an operation fault of the node (for example, node downtime). Crash fault tolerance (CFT) means that the blockchain network can still operate normally even if a specific quantity of nodes crash (for example, node downtime). In the embodiments of this disclosure, a crash fault tolerance consensus algorithm is used as a consensus algorithm of a first type. The consensus algorithm of the first type can realize high consensus efficiency, and can detect node crashes, malicious nodes, or node errors, but cannot resolve a Byzantine problem.

4) Byzantine fault: It is a type of an error caused by a software error or a malicious behavior of a node. A Byzantine node is a node with the Byzantine fault. In a distributed environment, a blockchain network with a Byzantine fault tolerance (BFT) consensus algorithm tolerates the Byzantine fault. In other words, the blockchain network can still operate normally in a distributed environment when having a specific quantity of Byzantine nodes. In the embodiments of this disclosure, the Byzantine fault tolerance consensus algorithm is used as a consensus algorithm of a second type.

4) Consensus algorithm switching: It is also referred to as consensus algorithm adaptation. In a favorable network environment (for example, no malicious node exists or no node fault exists, or a quantity of malicious nodes or node errors is less than a set threshold), the blockchain network automatically adopts a consensus algorithm that has high consensus efficiency and can detect erroneous nodes (node crashes, malicious nodes, or node errors). When a malicious node or a node fault is detected (that is, when a node with the Byzantine problem is detected), the blockchain network may automatically switch to the consensus algorithm that can resolve the Byzantine fault tolerance.

5) Consortium blockchain: It is a blockchain in which members of a specific group and a limited third party are used as an access party and services are provided. In the consortium blockchain, a plurality of preselected nodes are designated as nodes for running a consensus algorithm and a blockchain. Generation of each block is jointly determined by all of the preselected nodes. Another access node may not participate in consensus processing and storage of the blockchain, and another third party may perform restricted querying on the blockchain through an open application programming interface (API) of the blockchain.

The blockchain network in the embodiments of this disclosure is formed by a client and a plurality of nodes (computing devices in an access network in any form, such as a server and a user terminal) connected through network communication.

FIG. 1 is a schematic structural diagram of a blockchain network 200 according to an embodiment of this disclosure. The blockchain network is formed by a plurality of nodes 210 (computing devices in an access network in any form, such as a server and a user terminal) and a client 300. A peer to peer (P2P) network is formed between the nodes 210. A P2P protocol is an application layer protocol running over a transmission control protocol (TCP).

Referring to FIG. 1, the nodes 210 in the blockchain network shown include the following functions:

(1) Routing: It is a basic function of the nodes, and is configured to support communication between the nodes.

In addition to the routing function, the nodes may further have the following functions:

(2) Application: It is deployed in a node of the blockchain network, and is configured to: implement a particular service according to an actual service requirement, record and implement a function-related message, carry a digital signature in the message to indicate a source of the message, and send the message to another node in the blockchain network, so that the another node adds the message to a temporary block when successfully verifying a source and integrity of the message.

For example, the application implements the following services:

2.1) Shared account book: It is a function providing operations such as storage, query, and modification of a message (which carries data). A message indicating an operation on the message is sent to the another node in the blockchain network. After verifying that the message is effective, the another node stores the message to a temporary block and may further send a confirmation to a node initiating the operation, to provide a response indicating that the message is confirmed to be effective.

2.2) Intelligent contract: It is a computerized protocol, may be used for executing terms of a contract, and is implemented by a code that is deployed in the shared account book and that is executed when a specific condition is satisfied. The code is used for completing automated message processing according to an actual service requirement, for example, querying of a delivery status of goods purchased by a purchaser, and transfer of electronic money of the purchaser to an account of a merchant after the purchaser acknowledges receipt of the goods.

(3) Blockchain: It includes a series of blocks arranged in a chronological order of generation. Any new block added to the blockchain will not be removed. The block records messages submitted by the nodes in the blockchain network.

Figure 2A:
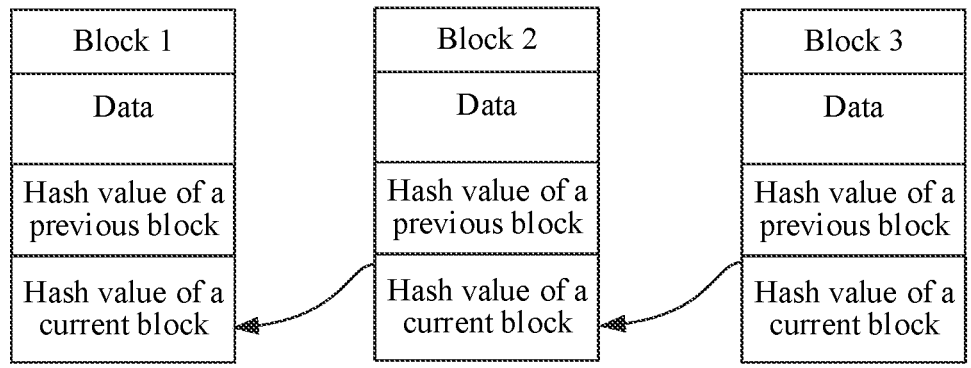
FIG. 2A is a schematic diagram of a block structure according to an embodiment of this disclosure.

FIG. 2A is a schematic diagram of a block structure according to an embodiment of this disclosure. Each block includes a hash value of a message log stored in the current block (a hash value of the current block) and a hash value of a previous block. The blocks are connected based on hash values to form the blockchain. In addition, the block may further include information such as a timestamp indicating a block generation time.

Figure 2B:
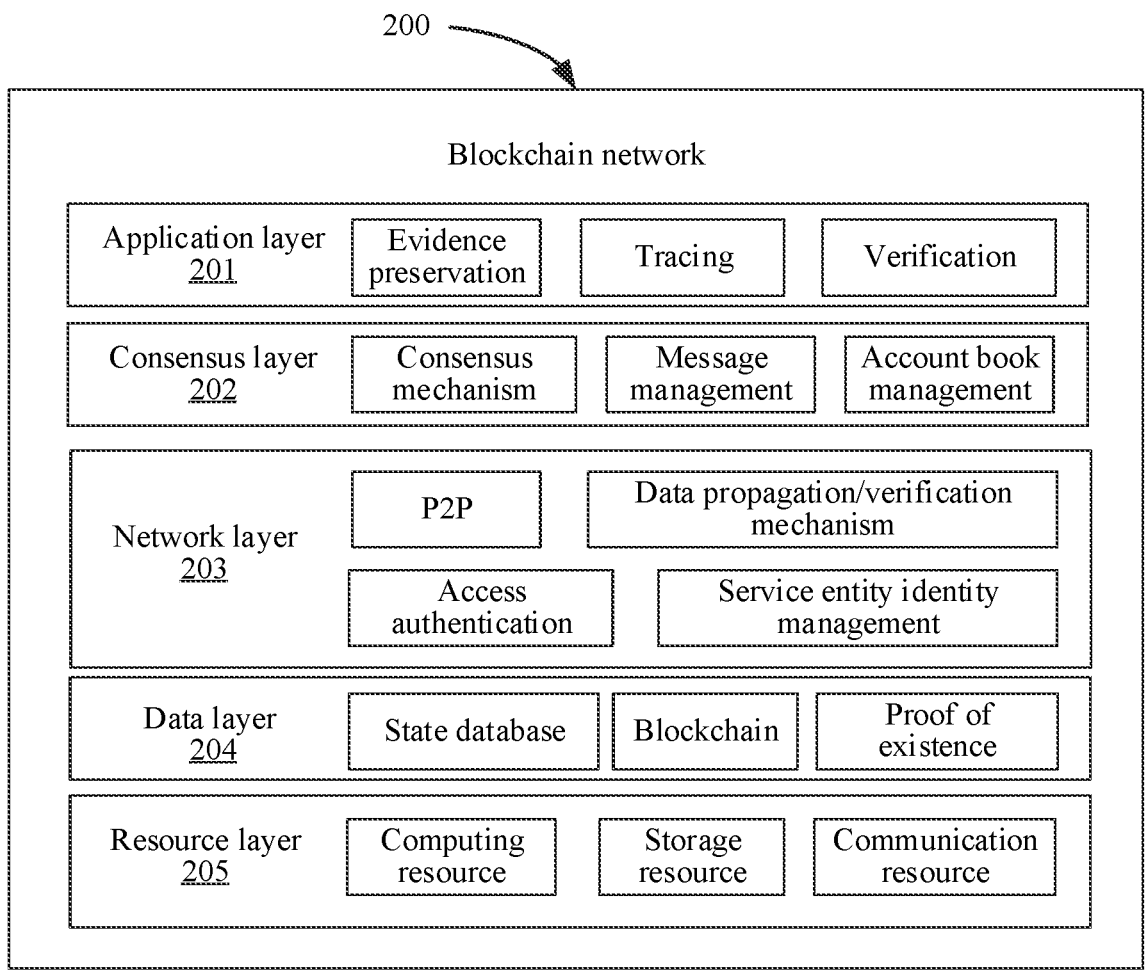
FIG. 2B is a schematic diagram of a functional architecture of a blockchain network 200 according to an embodiment of this disclosure.

An exemplary functional architecture of the blockchain network provided in this embodiment of this disclosure is described below. FIG. 2B is a schematic diagram of a functional architecture of a blockchain network 200 according to an embodiment of this disclosure. The blockchain network includes an application layer 201, a consensus layer 202, a network layer 203, a data layer 204, and a resource layer 205, which are described below.

The resource layer 205 encapsulates a computing resource, a storage resource, and a communication resource for implementing nodes 210 in the blockchain network 200, such as a computing resource, a storage resource, and a communication resource in a computer, a server/cluster, and a cloud, and performs abstraction and provides a unified interface to the data layer 204 to hide a difference between pieces of underlying hardware implementing the resource layer 205.

The computing resource includes processors of various forms, such as a central processing unit (CPU), an application specific integrated circuit (ASIC), and a field-programmable gate array (FPGA).

The storage resource includes storage media of various types, such as a volatile memory and a non-volatile memory. The communication resource includes links for communication between the nodes 210 of the blockchain network and between the blockchain network 200 and service entities.

The data layer 204 encapsulates data structures for implementing the account book, including a blockchain implemented through files in a file system, a key-value state database, and a proof of existence.

The network layer 203 encapsulates functions such as a point to point (P2P) network protocol, a data propagation mechanism, a data verification mechanism, an access authentication mechanism, and service entity identity management.

The P2P network protocol realizes communication between the nodes 210 in the blockchain network 200. The data propagation mechanism ensures propagation of messages in the blockchain network 200. The data verification mechanism is configured to achieve reliability of data transmission between the nodes 210 based on a cryptography method (such as a digital certificate, a digital signature, or a public/private key pair). The access authentication mechanism is configured to authenticate identities of service entities joining the blockchain network 200 based on actual service scenarios, and grant permissions for the service entities to access the blockchain network 200 when the authentication succeeds. The service entity identity management is configured to store the identities and permissions of the service entities (for example, a type of messages allowed to be initiated) that are allowed to access the blockchain network 200.

The consensus layer 202 encapsulates a mechanism (that is, a consensus mechanism) for the nodes 210 in the blockchain network 200 to reach a consensus on a block, a message management function, and an account book management function.

The consensus mechanism includes consensus algorithms such as POS, POW, and DPOS, and supports pluggability of the consensus algorithms.

Message management function: It is configured to verify a digital signature carried in a message received by the nodes 210, verify identity information of a service entity, and determine whether the service entity has a permission to send the message (read relevant information from the service entity identity management) based on the identity information. Service entities authorized to access the blockchain network 200 each possess a digital certificate issued by an authentication center. The service entities utilize private keys in the digital certificates thereof to sign for a submitted message, thereby proving authorized identities thereof.

Account book management function: It is configured to: maintain the blockchain and the state database; add a block on which a consensus is reached to a tail of the blockchain; and execute a message in the block on which a consensus is reached. When the message includes an updating operation, a key-value pair in the state database is updated. When the message includes a querying operation, the key-value pair in the state database is queried, and a querying result is returned to a service entity. A multi-dimension querying operation may be performed on the state database, including: querying a block based on a sequence number thereof (such as a hash value of the message); querying the block based on a hash value of the block; querying the block based on a sequence number of the message; querying the message based on the sequence number of the message; querying account data of the service entity based on an account thereof (a serial number); and querying a blockchain in a channel based on a name of the channel.

The application layer 201 encapsulates services that the blockchain network can realize, including message tracing, evidence preservation, and verification.

Figure 3:
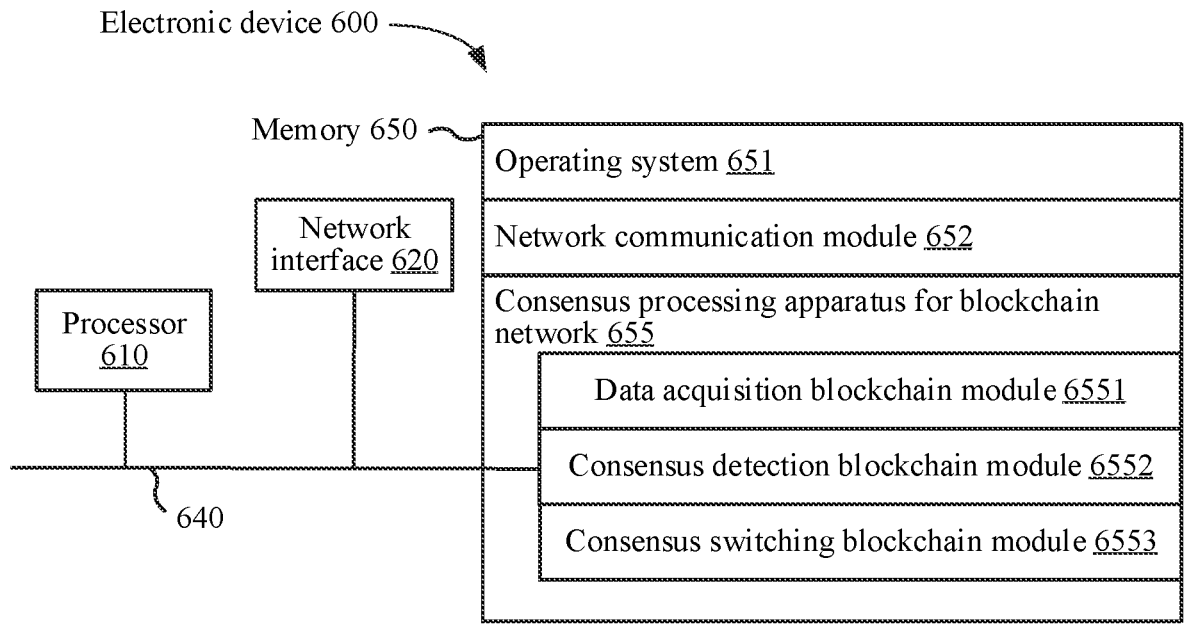
FIG. 3 is a schematic structural diagram of an electronic device running a node in a blockchain network according to an embodiment of this disclosure.

An exemplary structure of an electronic device running the nodes in the blockchain network provided in the embodiments of this disclosure is described below. As shown in FIG. 3, FIG. 3 is a schematic structural diagram of an electronic device 600 running the nodes 210 in the blockchain network 200 according to an embodiment of this disclosure. The electronic device may be a terminal (for example, a PC), a server, or a server cluster. The electronic device provides a virtualized environment for the nodes 210 in the blockchain network 200, and provides resources (including a computing resource, a storage resource, and a communication resource) for running of the nodes 210. The electronic device 600 shown in FIG. 3 includes at least one processor 610, a memory 650, and at least one network interface 620. The components in the electronic device 600 are coupled together through a bus system 640. It may be understood that, the bus system 640 is configured to implement connection and communication between the components. In addition to the data bus, the bus system 640 further includes a power bus, a control bus, and a status signal bus. However, for clarity, all buses are marked as a bus system 640 in FIG. 3.

The processor 610 may be an integrated circuit chip and has a signal processing capability. The memory 650 is removable, non-removable, or a combination thereof. The memory 650 may be a volatile memory or a non-volatile memory, or may include both a volatile memory and a non-volatile memory. In some embodiments, the memory 650 can store data and support various operations. Examples of the data include a program, a module, and a data structure, or a subset or a superset thereof. An exemplary description is provided below.

An operating system 651 includes system programs configured to process various basic system services and perform hardware-related tasks, such as a framework layer, a core library layer, and a drive layer, which are configured to implement various basic services and process hardware-based tasks. A network communication module 652 is configured to arrive at another computing device through one or more (wired or wireless) network interfaces 620. An exemplary network interface 620 includes Bluetooth, wireless fidelity (Wi-Fi), a universal serial bus (USB), and the like.

In some embodiments, a consensus processing apparatus for a blockchain network provided in the embodiments of this disclosure may be implemented by using software. FIG. 2 shows a consensus processing apparatus 655 for a blockchain network stored in the memory 650, which may be software in a form of a program or a plug-in, and include the following software modules: a data acquisition blockchain module 6551, a consensus detection blockchain module 6552, and a consensus switching blockchain module 6553. The modules are logical modules. Therefore, the modules may be combined or further split based on functions to be implemented by the modules. Functions of the modules are described below.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

A consensus processing method for a blockchain network provided in the embodiments of this disclosure is described with reference to exemplary application and implementation of the blockchain network provided in the embodiments of this disclosure.

In the embodiments of this disclosure, the blockchain network includes a plurality of nodes. At least some of the plurality of nodes are configured to perform consensus processing on a message transmitted by a client based on a consensus algorithm. After a consensus is reached, a processing result of each node for the message is stored in the blockchain. Referring to FIG. 1, the nodes 210 in the blockchain network 200 correspond to a plurality of functions. Some nodes perform only a routing function and a blockchain function, some nodes perform only the blockchain function, an application function, and the routing function, and some nodes perform the blockchain function, a consensus function, and the routing function. Different nodes may perform different functions. At least some nodes 210 in the blockchain network 200 may be configured to perform consensus processing on the message sent by the client based on the consensus algorithm, while the other nodes 210 may not perform the consensus processing.

Figure 4A:
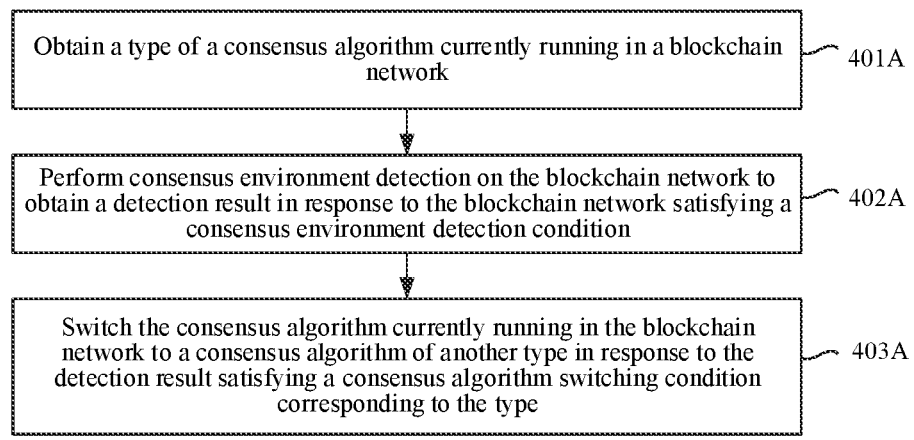
FIG. 4A to FIG. 4F are schematic flowcharts of a consensus processing method for a blockchain network according to an embodiment of this disclosure.

FIG. 4A is a schematic flowchart of a consensus processing method for a blockchain network according to an embodiment of this disclosure. The method is described with reference to step 401A to step 403A in FIG. 4A. The nodes in the blockchain network perform the method.

Exemplarily, the nodes performing the method may be any node in the blockchain network, a node belonging to any access party, or a node jointly designated by a plurality of access parties.

Step 401A: Obtain a type of a consensus algorithm currently running in a blockchain network.

The type of the consensus algorithm includes a first type and a second type, consensus performance of a consensus algorithm of the first type is greater than consensus performance of a consensus algorithm of the second type, and fault tolerance performance of the consensus algorithm of the second type is greater than fault tolerance performance of the consensus algorithm of the first type.

Exemplarily, the blockchain network in the embodiments of this disclosure is a consortium blockchain network, and may be applied to a message processing scenario. The consensus algorithm of the first type of is a crash fault tolerance consensus algorithm, and the consensus algorithm of the second type is a Byzantine fault tolerance consensus algorithm. The Byzantine fault tolerance consensus algorithm has a Byzantine fault tolerance capability, which can prevent a malicious behavior of a malicious node in an untrustable blockchain scenario, thereby reaching a consensus. The Byzantine fault tolerance consensus algorithm has higher fault tolerance performance for a Byzantine node than the crash fault tolerance consensus algorithm.

A consensus process of the crash fault tolerance consensus algorithm includes a preparation stage and a submission stage. Each stage is a process of communication between a master node and a slave node. No interaction is required between slave nodes. A consensus process of the Byzantine fault tolerance consensus algorithm includes a pre-preparation stage, a preparation stage, and a submission stage. A consensus is reached after three communication processes. Interaction needs to be performed between slave nodes in the communication process. The communication process of the Byzantine fault tolerance consensus algorithm is more complex than the communication process of the crash fault tolerance consensus algorithm. Consensus performance of the crash fault tolerance consensus algorithm is higher than consensus performance of the Byzantine fault tolerance consensus algorithm. Different types of consensus algorithms correspond to different communication processes. The type of the consensus algorithm currently run may be determined based on the communication process between the nodes in the blockchain network.

In the embodiments of this disclosure, when the blockchain network currently runs the consensus algorithm of the first type, that is, when the blockchain network currently runs the crash fault tolerance consensus algorithm, the consensus is reached on the message by using the crash fault tolerance consensus algorithm in the following manners: Each of the nodes performs signature processing on the message in response to the message being transmitted to each node. In response to a proportion of a quantity of normal nodes in the blockchain network to a total quantity of nodes being greater than or equal to a response proportion threshold (for example, $2/3$), and a proportion of effective consensus response messages in consensus response messages of the normal nodes to all consensus response messages being greater than an effective proportion threshold (for example, $1/2$), it is determined that the consensus is reached on the message based on the consensus algorithm of the first type (the crash fault tolerance consensus algorithm). The message and the signature of each node are stored in blocks of the nodes after the consensus is reached.

The normal nodes are nodes that make a response to the message, and signatures of the effective consensus response messages are effective signatures.

Exemplarily, when the message is transmitted to the node, the node signs a digital signature on the message. The digital signature is a ciphertext formed through encryption of a digest of digital content by using a private key of an asymmetric encryption algorithm. The digital signature is used for verifying integrity and a source (or non-repudiation) of the digital content. When a consensus response message including a digital signature fed back by a node is received, the digital signature carried in the consensus response message is decoded to obtain a digital digest corresponding to the digital signature. The digital digest is compared with an original digital digest corresponding to the message. When a comparison result is same, the signature is effective, which means that the consensus response message is an effective consensus response message.

Step 402A: Perform consensus environment detection on the blockchain network to obtain a detection result in response to the blockchain network satisfying a consensus environment detection condition.

The detection result indicates whether a fault occurs when the at least some nodes perform consensus processing on the message based on the consensus algorithm.

Exemplarily, the consensus environment detection condition includes at least one of the following described in detail below.

(1) A new node accesses the blockchain network. For example, a new access party joins the blockchain network. A plurality of electronic devices (such as terminals or servers) of the access party join the blockchain network. Each of the electronic devices is a node, and therefore the new access party corresponds to a plurality of new nodes. In this case, the consensus environment detection condition is satisfied, and the consensus environment detection is performed on blockchain network.

(2) A load of at least one of the nodes in the blockchain network exceeds a node load threshold.

Exemplarily, the node load threshold is a load capacity of a device as a node. When the load of the node exceeds the node threshold, the node may encounter a problem such as downtime. When the load of the at least one node in the blockchain network exceeds the node load threshold, the consensus environment detection condition is satisfied, and the consensus environment detection is performed on the blockchain network.

For example, a load value of the node may be represented by at least one the following parameters: a usage rate of a CPU in the node and an input/output (I/O) throughput of the CPU in the node.

(3) A load corresponding to at least one access party in the blockchain network exceeds a load threshold.

Exemplarily, different access parties exist in the blockchain network. For example, in the consortium blockchain that should be configured as a message, the access parties may correspond to a plurality of enterprises, banks, and message supervisors respectively. Each access party accesses the plurality of nodes in the blockchain network. The node has a limited data processing capability. When a load of a node corresponding to the access party exceeds a load threshold of the access party, the consensus environment detection condition is satisfied, and the consensus environment detection is performed on the blockchain network.

(4) A quantity of nodes corresponding to at least one network segment in the blockchain network exceeds a node load quantity threshold of the network segment.

Exemplarily, a network segment is a part of a network that enables direct communication using a same physical layer device (a transmission medium, a repeater, a hub, or the like). The nodes in the blockchain network may use different network segments. A communication load capacity of each network segment has a corresponding threshold, for example, a node load quantity threshold of the network segment (that is, an upper limit of a quantity of nodes allowed to access the network). When a quantity of nodes accessing the at least one network segment is greater than the node load quantity threshold of the network segment, the consensus environment detection condition is satisfied, and the consensus environment detection is performed on the blockchain network.

In some embodiments, a corresponding detection cycle may be set based on an application scenario of the blockchain network. For example, the blockchain network is applied to a message processing scenario. A detection cycle T (for example, 1 minute) is set. Detection is performed on a block in the blockchain network within a current cycle every detection cycle.

Figure 4B:
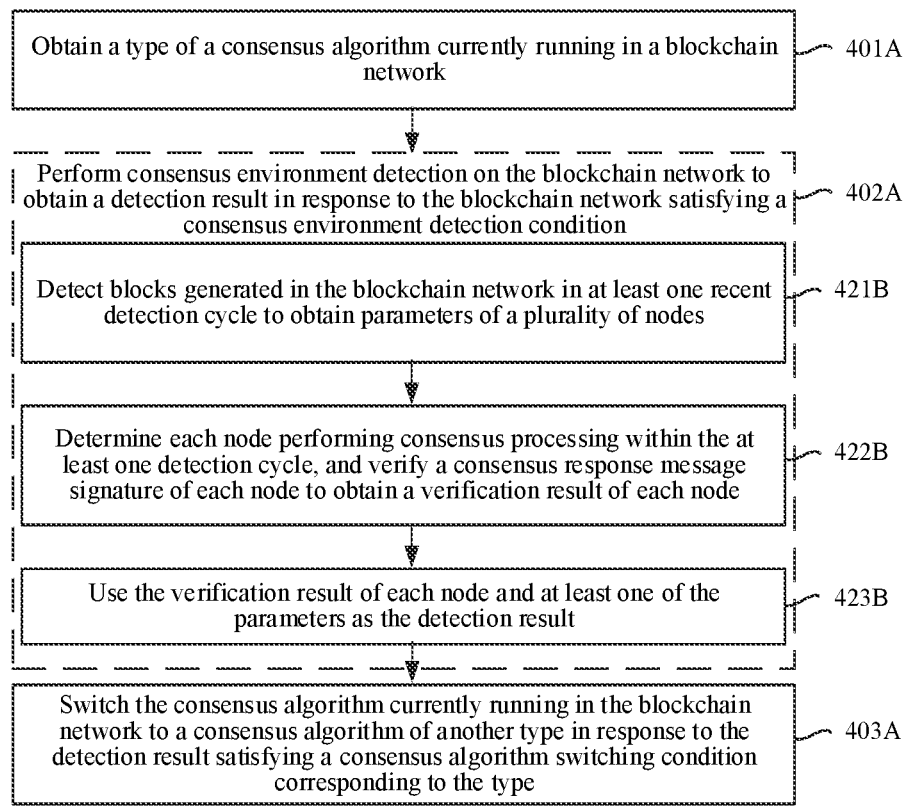

In some embodiments, FIG. 4B is a schematic flowchart of a consensus processing method for a blockchain network according to an embodiment of this disclosure. Step 402A may be implemented by using step 421B to step 423B. Details are described below.

Step 421B: Detect blocks generated in the blockchain network in at least one recent detection cycle to obtain parameters of the plurality of nodes.

The parameters include at least one of a type of each of the nodes, an access party corresponding to each node, and a network segment corresponding to each node.

Figure 5A:
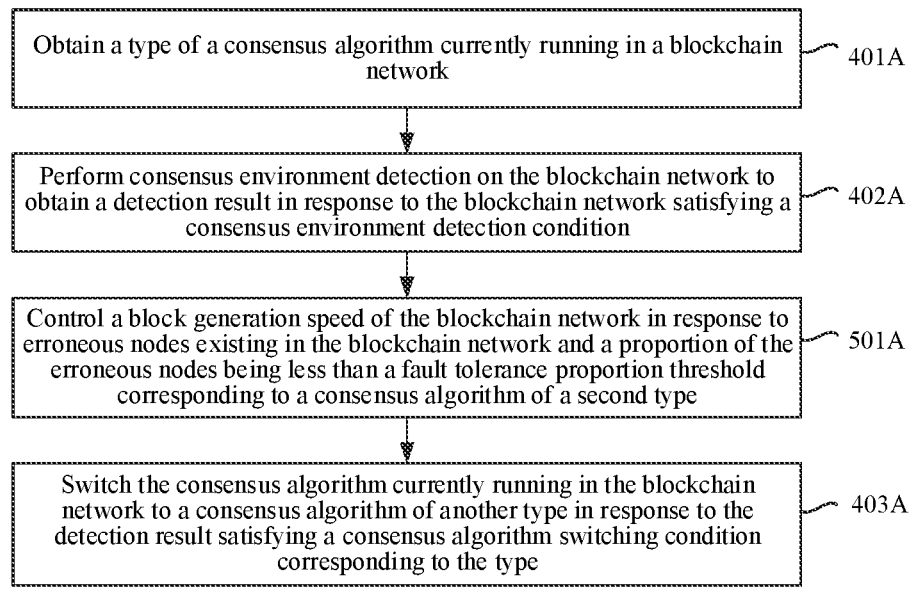
FIG. 5A to FIG. 5C are schematic flowcharts of a consensus processing method for a blockchain network according to an embodiment of this disclosure.
Figure 5B:
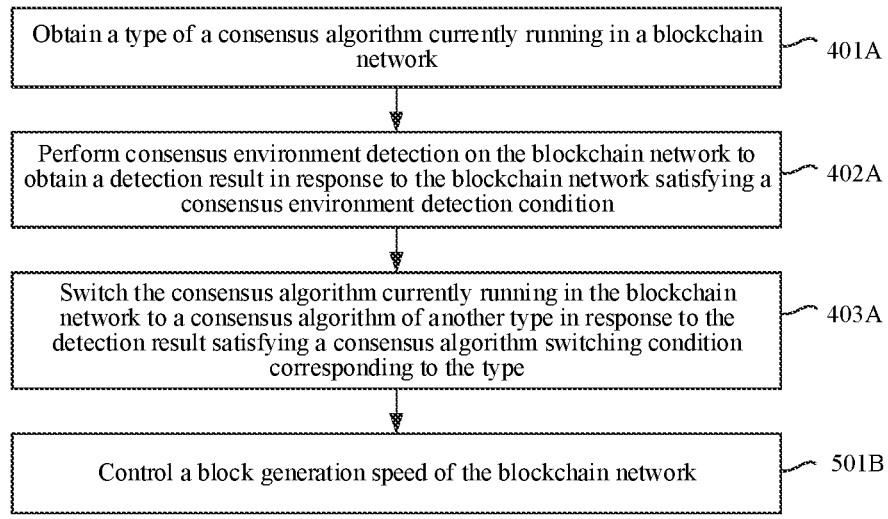
Figure 5C:
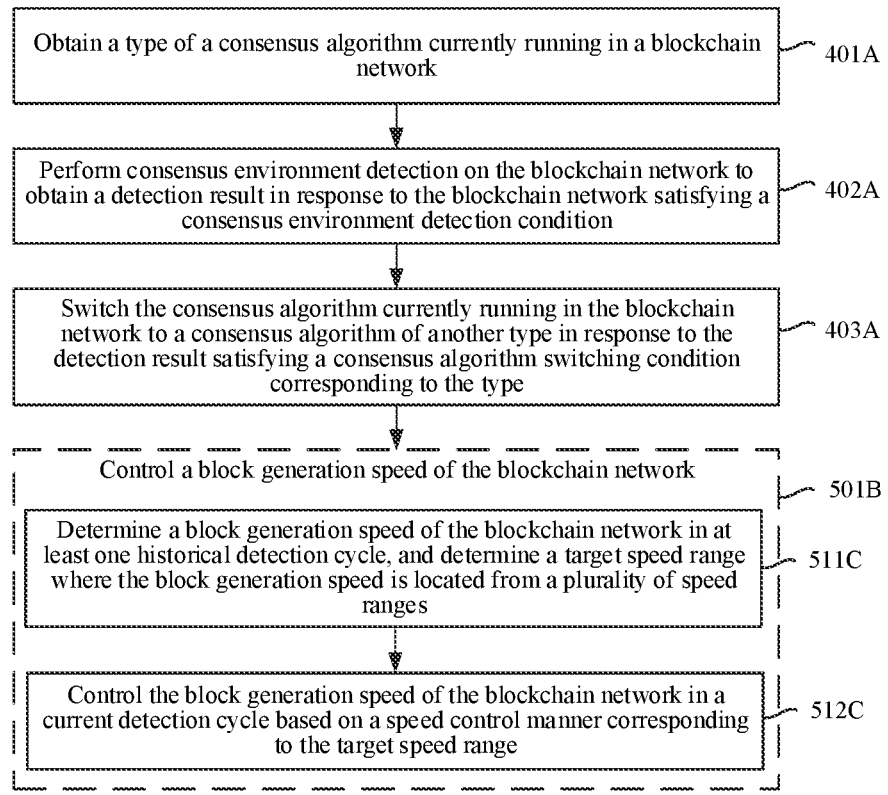
Figure 5D:
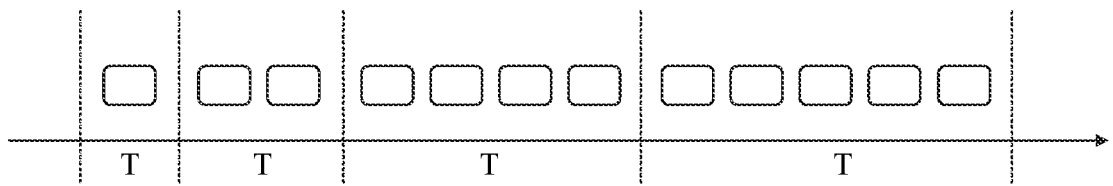
FIG. 5D is a schematic diagram of a detection cycle according to an embodiment of this disclosure.

Exemplarily, FIG. 5D is a schematic diagram of a detection cycle according to an embodiment of this disclosure. The detection cycle is T, and 1, 2, 4, and 5 blocks are respectively generated in the detection cycles. In the blocks generated in at least one recent detection cycle, results of processing the message by nodes having processed the message in the at least one recent detection cycle are stored. The parameters corresponding to the nodes may be obtained through detection on the generated blocks.

Exemplarily, in terms of a function, a node type includes an account keeping node, an endorsement node, a sorting node, a consensus node, and the like. For example, in a scenario of processing a service-related message, a type of the access party corresponding to the nodes includes a message initiator (for example, an enterprise), a message processor (for example, a bank), and a message supervisor.

For example, the detection cycle may be synchronized to a block generation cycle of the blockchain network (that is, a time required for generating a new block in the blockchain network). Certainly, the detection cycle may alternatively be twice or more times a value of the block generation cycle of the blockchain network.

Step 422B: Determine each node performing consensus processing within the at least one detection cycle, and verify a consensus response message signature of each node to obtain a verification result of each node.

A verification result of the node with a correct consensus response message signature is a correct node, and a verification result of the node with an erroneous consensus response message signature is an erroneous node.

Exemplarily, based on blocks generated in the at least one current detection cycle, each node performing the consensus processing within the at least one detection cycle is determined, and the consensus response message signature of each node is verified. When a consensus response message including a digital signature fed back by a node is received, the digital signature carried in the consensus response message is decoded to obtain a digital digest corresponding to the digital signature. The digital digest is compared with an original digital digest corresponding to the message. When a comparison result is same, the consensus response message signature is correct, or vice versa.

Step 423B: Use the verification result of each node and at least one of the parameters as the detection result.

Exemplarily, based on the detection result, the following may be calculated: a quantity of correct nodes and a quantity of erroneous nodes in the blockchain network, a quantity of the consensus response messages, a quantity of the effective consensus response messages, the access parties in the blockchain network, a quantity of the nodes corresponding to each access party in the blockchain network, different network segments in the blockchain network, a quantity of the nodes corresponding to each network segment in the blockchain network, and the like.

Still refer to FIG. 4A. Step 403A: Switch the consensus algorithm currently running in the blockchain network to a consensus algorithm of another type in response to the detection result satisfying a consensus algorithm switching condition corresponding to the type.

Exemplarily, different types of consensus algorithms have different consensus performance or fault tolerance capabilities. In this embodiment of this disclosure, different consensus algorithm switching conditions are set for the different types of consensus algorithms, which realizes more flexible consensus algorithm switching, so that efficiency of consensus algorithm switching is improved, thereby improving a fault tolerance capability and stability of the blockchain network.

In an embodiment, the detection result includes a quantity of erroneous nodes in the blockchain network within one or more detection cycles. The erroneous nodes are nodes (for example, Byzantine nodes) that transmit an erroneous consensus response message for the message in the blockchain network.

When the blockchain network currently runs the consensus algorithm of the second type, step 403A may be implemented in the following manner: switching the consensus algorithm of the second type currently running in the blockchain network to the consensus algorithm of the first type in response to a quantity of the Byzantine nodes detected in the blockchain network within one or more consecutive or inconsecutive detection cycles being less than or equal to a consensus proportion threshold.

Exemplarily, the consensus proportion threshold may be 0. For example, the blockchain network is running a Byzantine fault tolerance algorithm. In response to no Byzantine node being detected in a plurality of consecutive detection cycles, the Byzantine fault tolerance consensus algorithm is switched to a crash fault tolerance consensus algorithm.

Figure 4C:
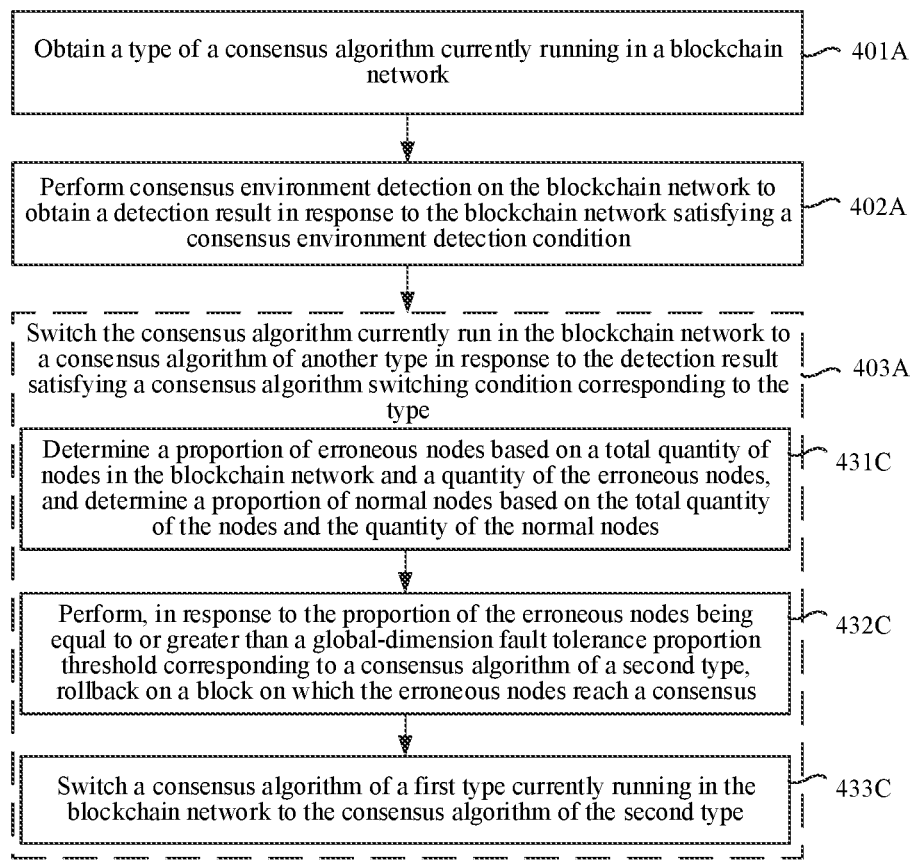

In some embodiments, FIG. 4C is a schematic flowchart of a consensus processing method for a blockchain network according to an embodiment of this disclosure. When the blockchain network currently runs the consensus algorithm of the first type (the crash fault tolerance consensus algorithm), step 403A may be implemented through step 431C to step 433C. Details are described below.

Step 431C: Determine a proportion of the erroneous nodes based on a total quantity of nodes in the blockchain network and the quantity of the erroneous nodes, and determine a proportion of the normal nodes based on the total quantity of the nodes and the quantity of the normal nodes.

For example, the detection result includes a quantity of normal nodes and a quantity of erroneous nodes in the blockchain network. The normal nodes are nodes without an operation fault, and the erroneous nodes are nodes with an operation fault. For example, a node having a message fault or loss due to the operation fault is an erroneous node. The erroneous node may be a Byzantine node.

Step 432C: Perform, in response to the proportion of the erroneous nodes being equal to or greater than a global-dimension fault tolerance proportion threshold corresponding to the consensus algorithm of the second type, rollback on a block on which the erroneous nodes reach a consensus.

For example, the global-dimension fault tolerance proportion threshold is a difference between the proportion of the normal nodes and a preset fault tolerance proportion. The preset fault tolerance proportion is ⅔. When the blockchain network runs the crash fault tolerance consensus algorithm, the master node may receive a message from the slave node. The normal nodes are nodes that transmit messages (normal messages or erroneous messages) to the master node during detection. The proportion of the normal nodes is set to P, and a proportion of nodes (which may be normal nodes or faulty nodes) detected to transmit no message to the master node is set to (1−P). Assuming that the nodes detected to transmit no message to the master node are all Byzantine nodes, the erroneous nodes in the blockchain network are Byzantine nodes, and a proportion of the Byzantine nodes is Q, a total proportion of the Byzantine nodes in the blockchain network is (Q+1−P). If the proportion of the Byzantine nodes reaches (P−⅔), the total proportion of the Byzantine nodes is (P−⅔+1−P)=⅓. When the proportion of the Byzantine nodes in the detection result (P−⅔) is greater than the fault tolerance proportion threshold of the global dimension, it indicates that the crash fault tolerance consensus algorithm may be switched to the Byzantine fault tolerance algorithm.

Before switching of the consensus algorithm, since the blockchain network has reached a consensus in presence of the Byzantine fault, the blocks within the current detection cycle may be rolled back. That is to say, the blocks generated during the current detection cycle are deleted from the blockchain maintained by each node.

Step 433C: Switch the consensus algorithm of the first type currently running in the blockchain network to the consensus algorithm of the second type.

For example, the crash fault tolerance consensus algorithm currently running in the blockchain network is switched to the Byzantine fault tolerance algorithm, which improves the fault tolerance capability of the blockchain network.

Figure 4D:
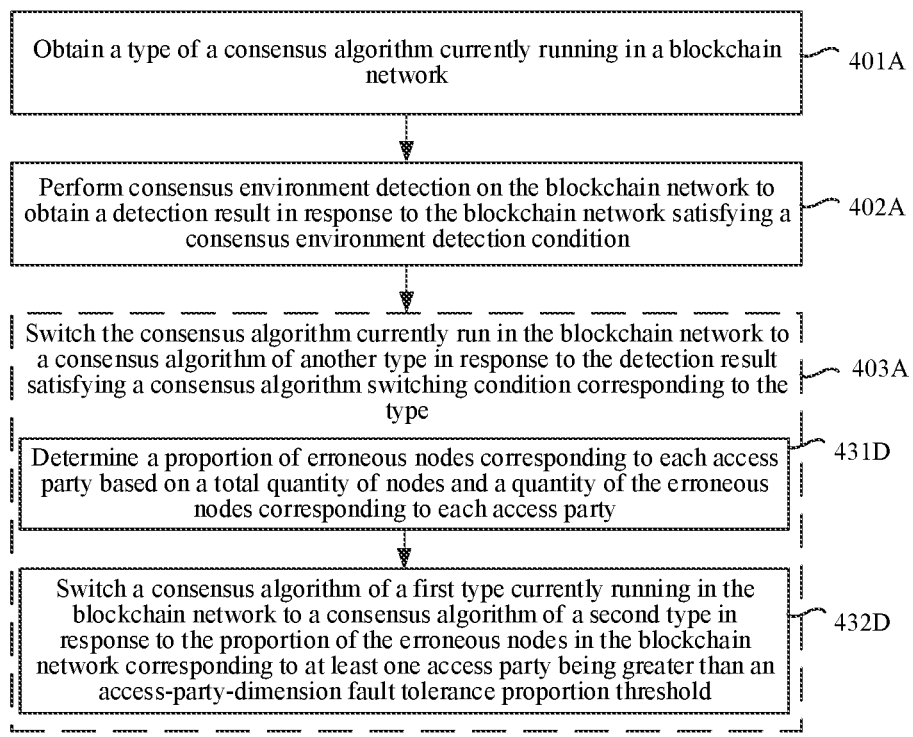

In some embodiments, FIG. 4D is a flowchart of a consensus processing method for a blockchain network according to an embodiment of this disclosure. When the blockchain network currently runs the consensus algorithm of the first type (the crash fault tolerance consensus algorithm), step 403A may be implemented through step 431D to step 432D. Details are described below.

Step 431D: Determine a proportion of the erroneous nodes corresponding to each access party based on a total quantity of nodes and the quantity of the erroneous nodes corresponding to each access party.

For example, the detection result includes a quantity of erroneous nodes in the blockchain network corresponding to each access party, a different access party corresponding to a different node, and the erroneous nodes being nodes with an operation fault. The blockchain network includes a plurality of types of the access parties.

For example, when the blockchain network is applied to message processing, the type of the access parties includes a message initiator (for example, an enterprise sending service messages), a message processor (for example, a bank processing service messages), and a message supervisor party (for example, an agency supervising service messages). A quantity of nodes corresponding to each access party may be different.

It is assumed that a large quantity of the access parties exist in the blockchain network, including a plurality of different enterprises, a plurality of banks, and one message supervision agency. A proportion of erroneous nodes corresponding to each access party is obtained by dividing a quantity of the erroneous nodes corresponding to each access party by a total quantity of nodes corresponding to each access party.

Step 432D: Switch the consensus algorithm of the first type currently running in the blockchain network to the consensus algorithm of the second type in response to the proportion of the erroneous nodes in the blockchain network corresponding to at least one access party being greater than an access-party-dimension fault tolerance proportion threshold.

Exemplarily, access-party-dimension fault tolerance proportion thresholds of different access parties may be the same or different. For example, different proportions may be set based on the quantities of the nodes corresponding to the access parties. A quantity of the at least one access party may be set based on fault tolerance requirements of a specific service scenario. For example, the at least one access party is all or some of the access parties in the blockchain network. When the proportion of the erroneous nodes corresponding to the at least one access party is greater than the access-party-dimension fault tolerance proportion threshold, blocks on which the erroneous nodes reach a consensus are rolled back, and the crash fault tolerance consensus algorithm currently running in the blockchain network is switched to the Byzantine fault tolerance algorithm.

In this embodiment of this disclosure, the consensus algorithm is switched based on the access party dimension, which can improve the fault tolerance performance of the blockchain network, so that the blockchain network runs more stably.

Figure 4E:
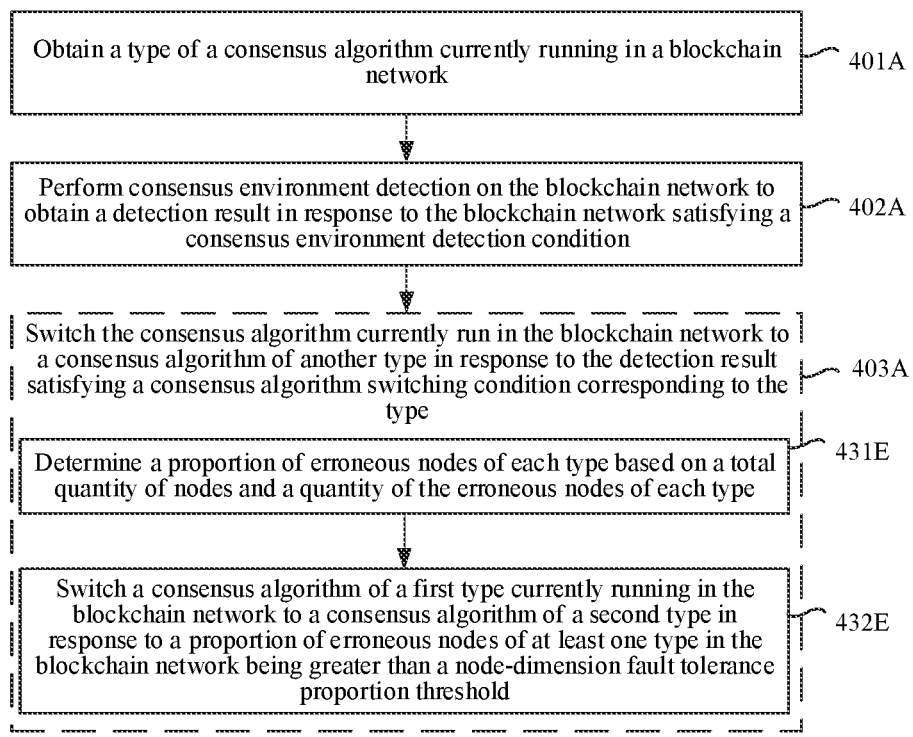

In some embodiments, FIG. 4E is a flowchart of a consensus processing method for a blockchain network according to an embodiment of this disclosure. When the blockchain network currently runs the consensus algorithm of the first type (the crash fault tolerance consensus algorithm), step 403A may be implemented through step 431E to step 432E. Details are described below.

Step 431E: Determine a proportion of the erroneous nodes of each type based on a total quantity of nodes and the quantity of the erroneous nodes of each type, Exemplarily, the corresponding detection result includes: a quantity of erroneous nodes of each type in the blockchain network, the erroneous nodes being nodes with an operation fault. The blockchain network includes a plurality of types of the nodes. In terms of a function, a node type includes an account keeping node, an endorsement node, a sorting node, a consensus node, and the like. The proportion of the erroneous nodes corresponding to each type is obtained through division of the quantity of the erroneous nodes corresponding to each type.

Step 432E: Switch the consensus algorithm of the first type currently running in the blockchain network to the consensus algorithm of the second type in response to a proportion of erroneous nodes of at least one type in the blockchain network being greater than a node-dimension fault tolerance proportion threshold.

Exemplarily, fault tolerance proportion thresholds of the node dimensions corresponding to different types of the nodes are the same, or adaptively set based on fault tolerance requirements of different access parties. A quantity of the at least one type may be set based on fault tolerance requirements of a specific service scenario. For example, the at least one type is all or some of the types in the blockchain network. When the proportion of the erroneous nodes corresponding to the at least one type is greater than a type-dimension fault tolerance proportion threshold, blocks on which the erroneous nodes reach a consensus are rolled back, and the crash fault tolerance consensus algorithm currently running in the blockchain network is switched to the Byzantine fault tolerance algorithm.

In this embodiment of this disclosure, the consensus algorithm is switched based on the access node type dimension, which can improve the fault tolerance performance of the blockchain network, so that the blockchain network runs more stably.

Figure 4F:
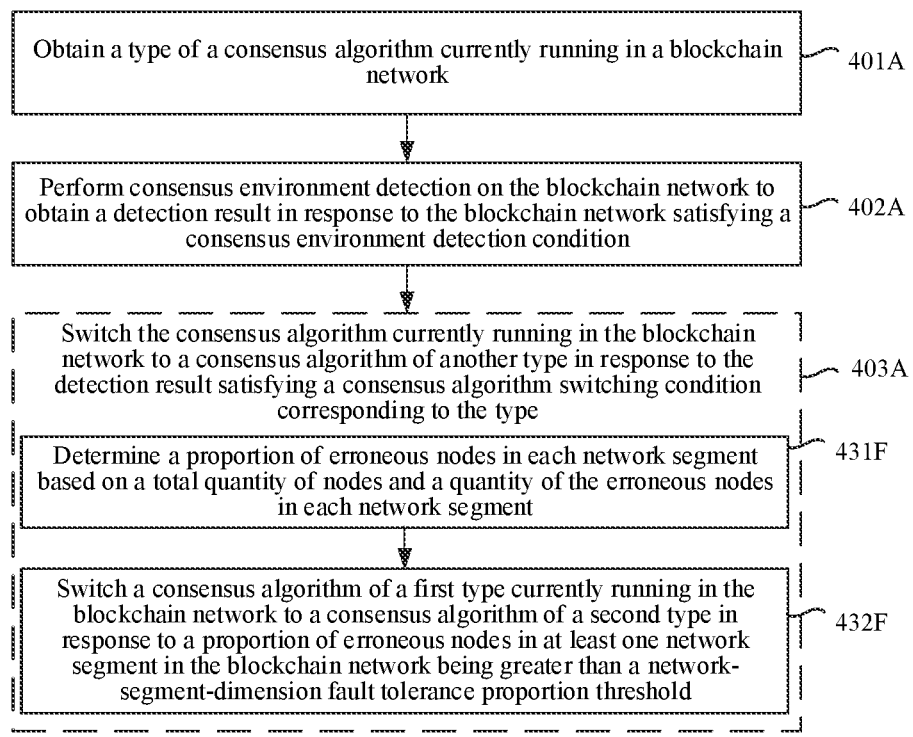

In some embodiments, FIG. 4F is a schematic flowchart of a consensus processing method for a blockchain network according to an embodiment of this disclosure. When the blockchain network currently runs the consensus algorithm of the first type (the crash fault tolerance consensus algorithm), step 403A may be implemented through step 431F to step 432F. Details are described below.

Step 431F: Determine a proportion of erroneous nodes in each network segment based on a total quantity of nodes and a quantity of the erroneous nodes in each network segment.

For example, the plurality of nodes in the blockchain network are located in a plurality of network segments. The detection result includes a quantity of erroneous nodes in each network segment in the blockchain network, the erroneous nodes being nodes with an operation fault. The proportion of the erroneous nodes corresponding to each network segment is obtained through division of the quantity of the erroneous nodes corresponding to each network segment.

Step 432F: Switch the consensus algorithm of the first type currently running in the blockchain network to the consensus algorithm of the second type in response to a proportion of erroneous nodes in at least one network segment in the blockchain network being greater than a network-segment-dimension fault tolerance proportion threshold.

Exemplarily, a network-segment-dimension fault tolerance proportion threshold corresponding to each network segment is determined based on a fault tolerance capability of each network segment. For example, network-segment-dimension fault tolerance proportion thresholds of different network segments may be the same or different. different proportions may be set based on the quantities of the nodes corresponding to the network segments. A quantity of the at least one network segment may be set based on fault tolerance requirements of a specific service scenario. For example, the at least one network segment is all or some of the network segments in the blockchain network. When the proportion of the erroneous nodes corresponding to the at least one network segment is greater than the network-segment-dimension fault tolerance proportion threshold, blocks on which the erroneous nodes reach a consensus are rolled back, and the crash fault tolerance consensus algorithm currently running in the blockchain network is switched to the Byzantine fault tolerance algorithm.

In some embodiments, when the blockchain network currently runs the consensus algorithm of the first type, FIG. 5A is a schematic flowchart of a consensus processing method for a blockchain network according to an embodiment of this disclosure. Before step 403A, a quantity of blocks rolled back before switching of the consensus algorithm may be reduced through step 501A. Details are described below.

Step 501A: Control a block generation speed of the blockchain network in response to erroneous nodes existing in the blockchain network and a proportion of the erroneous nodes being less than a fault tolerance proportion threshold corresponding to the consensus algorithm of the second type, Exemplarily, the block generation speed of blockchain network is controlled. In other words, a growth rate of the block generation speed is slowed through reduction of a block generation cycle of the blockchain network (for example, adjusted to half of an original block generation cycle or another value less than 1), thereby avoiding rollback of excessive blocks before switching of the consensus algorithm.

The erroneous nodes are nodes with an operation fault, and a type of the fault tolerance proportion threshold includes:

a global-dimension fault tolerance proportion threshold, that is, an upper limit of a proportion of a quantity of the faulty nodes in the blockchain network to the total quantity of nodes in the blockchain network;

an access-party-dimension fault tolerance proportion threshold, that is, an upper limit of a proportion of a quantity of faulty nodes corresponding to an access party to a total quantity of nodes of the access party;

a node-dimension fault tolerance proportion threshold, that is, an upper limit of a proportion of faulty nodes of a type (for example, faulty endorsement nodes, faulty account keeping nodes, faulty sorting nodes, or faulty consensus nodes) to a total quantity of nodes of the corresponding type; and a network-segment-dimension fault tolerance proportion threshold, that is, an upper limit of a proportion of faulty nodes in a network segment to a total quantity of nodes in the network segment.

In some embodiments, FIG. 5B is a flowchart of a consensus processing method for a blockchain network according to an embodiment of this disclosure. After step 403A, negative impact of a consensus performance change and a fault tolerance loss during switching of the consensus algorithm may be reduced through step 501B.

501B: Control the block generation speed of the blockchain network.

Exemplarily, a growth rate of the block generation speed is reduced, which can avoid system crashes caused by performance degradation and rollback of excessive blocks caused by decrease in the fault tolerance capability after switching of the consensus algorithm. The control of the block generation speed of the blockchain network in step 501A is the same as that in step 501B.

In some embodiments, FIG. 5C is a flowchart of a consensus processing method for a blockchain network according to an embodiment of this disclosure. Step 501B may be implemented through step 511C and step 512C. Details are described below.

511C: Determine a block generation speed of the blockchain network in at least one historical detection cycle, and determine a target speed range where the block generation speed is located from a plurality of speed ranges.

Exemplarily, endpoint speeds of the plurality of speed ranges are linked with each other in sequence. The plurality of speed ranges may be spliced to form a consecutive range. The at least one historical detection cycle may be more or one recent historical detection cycle.

In some embodiments, the speed range may be determined in following manners: obtaining a maximum block generation speed of the blockchain network, and determining a speed threshold based on the maximum block generation speed and a speed proportion threshold; and using zero as a first speed range, a range between zero and speed threshold as a second speed range, a range greater than or equal to speed threshold and less than the maximum block generation speed as a third speed range, and a range equal to maximum block generation speed as a fourth speed range.

A speed control manner corresponding to the first speed range is controlling the block generation speed to remain at a minimum block generation speed. A unit of the block generation speed is (quantity of blocks/unit time). In this embodiment of this disclosure, the unit of the block generation speed is (quantity of blocks/detection cycle), and it is assumed that each detection cycle is 1 minute, the minimum block generation speed may be 1 block per minute (1 block/min). A speed control manner corresponding to the second speed range is controlling the block generation speed to grow exponentially. The block generation speed in the second speed range is relatively low, which avoids rollback of excessive blocks caused by an excessively quick change in the block generation speed, and can avoid excessive ineffective messages in a message processing scenario. The growth rate of the block generation speed in the second range may be higher than the growth rate of the block generation speed in other ranges, to ensure that the block generation speed satisfies a requirement of the blockchain network. A speed control manner corresponding to the third speed range is controlling the block generation speed to grow uniformly, that is, grow linearly. Uniform growth of the blockchain generation speed can improve stability of the blockchain network. A speed control manner corresponding to the fourth speed range is controlling the block generation speed to remain at the maximum block generation speed. That is to say, it may be considered that the blockchain network can maintain stable running at the maximum block generation speed.

Exemplarily, the speed proportion threshold may be set to ½. In this case, the speed threshold is half of the maximum block generation speed. The speed range and the speed control manner corresponding to each speed range may be expressed as the following formula (2).

$$N_k = \begin{cases} 1 & N_{k-1} = 0 \\ a^k & N_{k-1} < M/2 \\ N_{k-1} + b & M/2 \leq N_{k-1} < M \\ M & N_{k-1} = M \end{cases} \quad \#(2)$$

a is a positive integer greater than 1. b and k are positive integers greater than or equal to 1. a and b may be set according to an actual requirement of the blockchain network. k is a label of the detection cycle. $N_k$ is a block generation speed in a current detection cycle. $N_{k-1}$ is block generation speed corresponding to a previous detection cycle of the current detection cycle. The first speed range is ($N_{k-1}=0$), the second speed range is ($N_{k-1}<M/2$), the third speed range is ($M/2 \leq N_{k-1} < M$), and the fourth speed range is ($N_{k-1}=M$).

In some embodiments, the speed range may be determined in following manner: obtaining a maximum block generation speed of a block of the blockchain network; and uniformly or non-uniformly dividing a range between the maximum block generation speed and zero into a plurality of speed ranges linked with each other in sequence. A speed value corresponding to each of the speed ranges is negatively correlated with a speed growth rate corresponding to a speed control manner for each speed range.

Exemplarily, the generation speed grows uniformly in each range. The growth rates of the block generation speeds corresponding to the ranges forms a dascending arithmetic progression.

Exemplarily, it is assumed n+1 speed ranges are arranged, and the speed ranges are uniform. The speed ranges and speed control manners corresponding to the speed ranges may be expressed as the following formula (3).

$$N_k = \begin{cases} N_{k-1} + c_1 & 0 \leq N_{k-1} < d_1 \\ \cdots & \cdots \\ N_{k-1} + c_n & d_n \leq N_{k-1} < M \\ M & N_{k-1} = M \end{cases} \quad \#(3)$$

Exemplarily, $c_1$ and $c_n$ are positive integers. $c_1$ to $c_n$ are growth rates of the generation speed, which form a gradually decreasing arithmetic progression. $d_1$ and $d_n$ are positive integers. A plurality of positive integers are included in $d_1$ to $d_n$, which form a gradually increasing arithmetic progression. It is assumed that the maximum block generation speed M is 48 blocks/min, and a plurality of speed ranges including a speed range greater than or equal to 0 and less than 10, a speed range greater than or equal to 10 and less than 24, a speed range greater than or equal to 24 and less than 36, a speed range greater than or equal to 36 and less than 48, and a speed range equal to 48 are generated. The generation speed grows uniformly in the ranges other than the range equal to 48. Growth rates corresponding to the ranges are 2, 4, 6, and 8 respectively. The growth rates corresponding to the ranges form an ascending arithmetic progression.

Step 512C: Control the block generation speed of the blockchain network in a current detection cycle based on a speed control manner corresponding to the target speed range.

A different speed range corresponds to a different speed control manner.

Exemplarily, the ranges corresponding to the formula (2) in the foregoing description are used to control the block generation speed. It is assumed that the detection cycle is 1 minute, the maximum block generation speed M is 1024 blocks per minute (1024 blocks/min), an initial block generation speed is $N_0=0$, and a block generation speed in a first detection cycle is $N_1=1$.

Block generation speeds in the detection cycles are successively 1 block/min, 4 blocks/min, 8 blocks/min, 16 blocks/min, . . . 512 blocks/min (the block generation speed grows exponentially in the second speed range, and the second speed range is greater than 0 and less than 512 blocks/min), 513 blocks/min, 514 blocks/min, . . . , 1024 blocks/min (the third speed range is greater than or equal to 512 blocks/min and less than 1024 blocks/min, and when the block generation speed reaches 1024 blocks/min, that is, the fourth speed range, the block generation speed remains at 1024 blocks/min).

Through the consensus processing method for a blockchain network provided in the embodiments of this disclosure, the blockchain network can switch to the crash fault tolerance consensus algorithm when no Byzantine nodes exist in a network environment, thereby satisfying an application scenario with a requirement for high performance. When a specific quantity of Byzantine nodes are detected in the blockchain network, the consensus algorithm is switched to the Byzantine fault tolerance consensus algorithm, thereby providing a higher fault tolerance capability. Controlling the block generation speed after switching of the consensus algorithm can reduce negative impact of a consensus performance change and a fault tolerance loss during switching of the consensus algorithm. Through the consensus processing solution provided in the embodiments of this disclosure, the consensus algorithm can be adaptively switched based on a change of a service scenario, which can not only provide a higher fault tolerance capability, but also satisfy an application scenario with a requirement for high performance.

In the following description, the consensus processing method for a blockchain network provided in the embodiments of this disclosure may be applied to a message processing scenario in a consortium blockchain, for example.

In a scenario of processing service-related messages, a malicious behavior of a malicious node needs to be prevented during transfer, purchase, or sale of assets (for example, game assets in online games). The Byzantine fault tolerance consensus algorithm may be used for fault tolerance of the malicious node, to ensure correctness of a message result. In addition, the message processing scenario requires an efficient consensus algorithm to achieve a high throughput. The crash fault tolerance consensus algorithm has higher performance. The consensus processing method for a blockchain network provided in the embodiment of this disclosure may be applied to the message processing scenario of the consortium blockchain, so that the consensus algorithm can be switched flexibly, and a fault tolerance capability and performance of the system (that is, the blockchain network, and the system in the following text is the blockchain network) is ensured.

Figure 6:
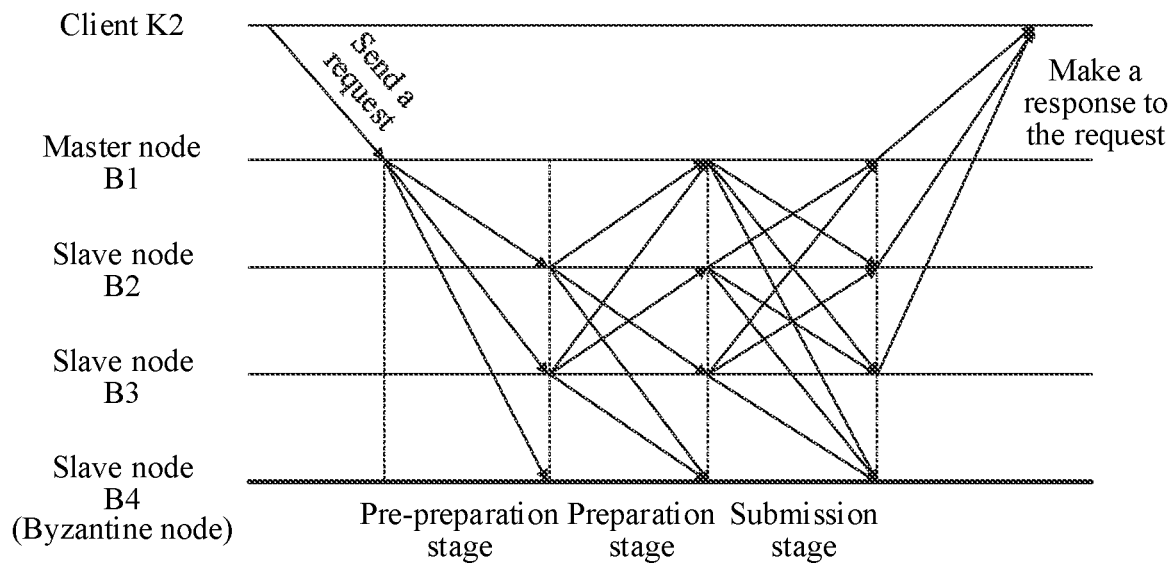
FIG. 6 is a schematic diagram of a consensus process of a crash fault tolerance consensus algorithm according to an embodiment of this disclosure.

FIG. 6 is a schematic diagram of a consensus process of a crash fault tolerance consensus algorithm according to an embodiment of this disclosure. This embodiment of this disclosure is described by using a consensus process of a recursive algorithm for fault tolerance (RAFT) of the crash fault tolerance type as an example. The consensus process may be abstracted as a preparation stage and a submission stage. After a master node C1 receives a message from a client K1, the preparation stage is initiated. The master node synchronizes a log record to slave nodes (a slave node C2, a slave node C3, and a slave node C4). After the slave nodes receive the message, the slave nodes send responses to the master node C1. After the master node C1 receives more than half of the responses, the submission stage is initiated. The master node C1 sends the message to the slave nodes for data submission and returns a result to the client K1. The consensus process of the RAFT includes two stages, and each of the stages includes only the process of communication between the master node and the slave nodes, and does not require interaction between the slave nodes. The overall communication complexity is O(n), n being a quantity of the nodes. Therefore, the crash fault tolerance consensus algorithm, notably, the RAFT, generally has a high throughput, and thus the overall system can achieve high performance. The crash fault tolerance consensus algorithm can tolerate crash error nodes of a maximum quantity (n−1)/2, n being a positive integer greater than or equal to 1.

Figure 7:
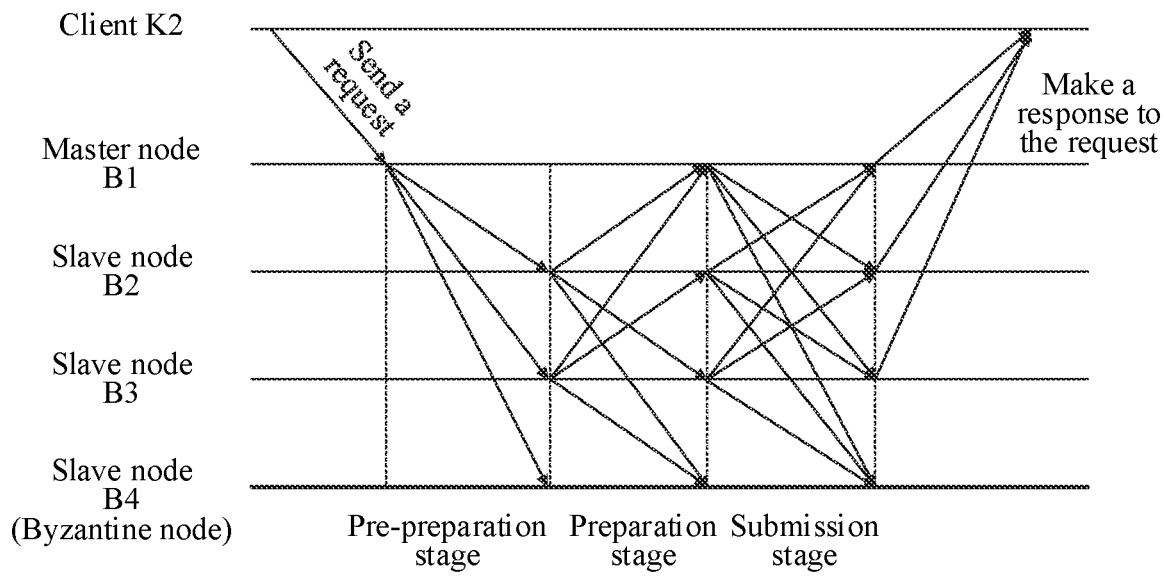
FIG. 7 is a schematic diagram of a consensus process of a Byzantium fault tolerance consensus algorithm according to an embodiment of this disclosure.

FIG. 7 is a schematic diagram of a consensus process of a Byzantium fault tolerance consensus algorithm according to an embodiment of this disclosure. The Byzantine fault tolerance consensus algorithm usually requires three rounds of communication to reach a consensus. In this embodiment of this disclosure, a practical Byzantine fault tolerance (PBFT) consensus algorithm of the Byzantine fault-tolerant type is used as an example for description. After a master node B1 receives a request from a client K2, a pre-preparation stage is initiated. The master node B1 sends a message to all slave nodes (a slave node B2, a slave node B3, and a slave node B4). The slave nodes receive the message and perform verification (for example, verify a signature). After the verification succeeds, a preparation stage is initiated. The nodes encapsulate the message (for example, perform signing), and then broadcast the message to other nodes. When a quantity of nodes receiving correct messages is greater than or equal to 2f+1 (including the node), f being a positive integer greater than or equal to 1, a submission stage is initiated. The nodes encapsulate the message and broadcast the message to the other nodes. When a quantity of nodes receiving correct submitted message greater than or equal to 2f+1 (including the node), a consensus is reached and the data is submitted. Moreover, a response request message is sent to the client. As shown in FIG. 2, the system can still reach a consensus even though 1 Byzantine node exists. The Byzantine fault tolerance consensus algorithm can tolerate Byzantine nodes of a quantity f=(n−1)/3, which is ⅓ of the quantity of the slave nodes. n is the total quantity of the nodes in the network (1 master node and n−1 slave nodes).

Through the consensus processing method for a blockchain network provided in the embodiments of this disclosure, adaptive switching between different consensus algorithms can be realized based on a change in an operating environment. The switching includes switching between the Byzantine fault tolerance consensus algorithm and the crash fault tolerance consensus algorithm.

In this embodiment of this disclosure, a consensus is reached by using the crash fault tolerance consensus algorithm in the following manner: Each of the nodes performs signature processing on the message in response to the message being transmitted to each node. In response to a proportion of a quantity of normal nodes in the blockchain network to a total quantity of nodes being greater than or equal to a response proportion threshold (for example, ⅔), and a proportion of effective consensus response messages in consensus response messages of the normal nodes to all consensus response messages being greater than an effective proportion threshold (for example, ½), it is determined that the consensus is reached on the message based on the consensus algorithm of the first type.

Figure 8A:
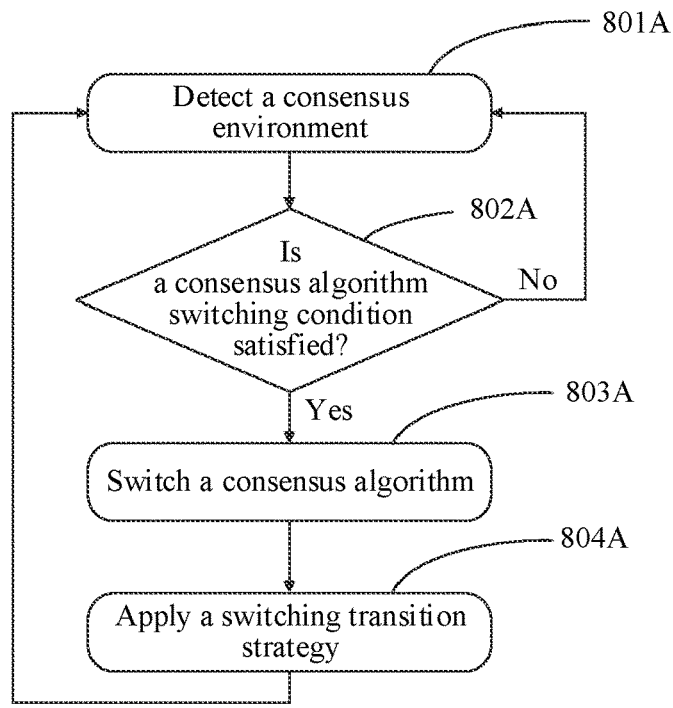
FIG. 8A to FIG. 8C are flowcharts of a consensus processing method for a blockchain according to an embodiment of this disclosure.

When a current consensus algorithm is the Byzantine fault tolerance consensus algorithm, FIG. 8A is a flowchart of a consensus processing method for a blockchain according to an embodiment of this disclosure. Details are described below.

Step 801A: Detect a consensus environment.

Exemplarily, an index to be detected during the consensus environment detection is a quantity of Byzantine nodes in a current system running environment. A detection method is verifying a consensus message signature of each node in a block. If the node verification succeeds, it indicates that no Byzantine fault occurs in the nodes. If the node verification fails, it indicates that a Byzantine fault or another error occurs.

FIG. 5D is a schematic diagram of a detection cycle according to an embodiment of this disclosure. The consensus environment detection is performed every unit time T. As shown in FIG. 5D, the time T may be set based on different service scenarios. For example, for a scenario that requires frequent detection, T may be set to a relatively small value. For example, in a scenario of processing service-related messages, T is set to a preset second (such as 5 seconds) for frequent detection, or T is set to a preset minute (such as 1 minute). A scope of each detection includes blocks generated within a current unit time T (that is, the foregoing detection cycle). A quantity of blocks generated in the unit time T (for example, 1 minute) depends on a switching transition strategy (that is, the process of controlling the block generation speed in the embodiments of this disclosure).

Step 802A: Determine whether a consensus algorithm switching condition is satisfied. When a result of the determination in step 802A is yes, step 803A is performed. Otherwise, step 801A is performed.

Exemplarily, in case of the Byzantine fault tolerance consensus algorithm, the consensus algorithm switching condition is: no Byzantine faults are detected after a plurality of consecutive consensus environment detections (that is, a quantity of Byzantine nodes is 0). The consensus algorithm switching condition being satisfied indicates that the nodes in the current running environment are trustable. In this case, the Byzantine fault tolerance consensus algorithm is switched to the crash fault tolerance consensus algorithm, which can improve system performance. A specific quantity of the detections may be customized based on a service scenario. If more reliable fault tolerance is required, a larger quantity of detections may be set.

Step 803A: Switch the consensus algorithm.

Exemplarily, when the current consensus algorithm is the Byzantine fault tolerance consensus algorithm, the consensus algorithm is switched from the current consensus algorithm to the crash fault tolerance algorithm.

Step 804A: Apply a switching transition strategy.

Exemplarily, in order to avoid system crashes caused by performance degradation and rollback of excessive blocks caused by decrease in the fault tolerance capability after switching of the consensus algorithm, the switching transition strategy is run after switching of the consensus algorithm, to control the block generation speed (that is, a consensus speed). The switching transition strategy is used for controlling the block generation speed after switching of the consensus algorithm, to prevent system crashes or rollback of excessive blocks.

Figure 8B:
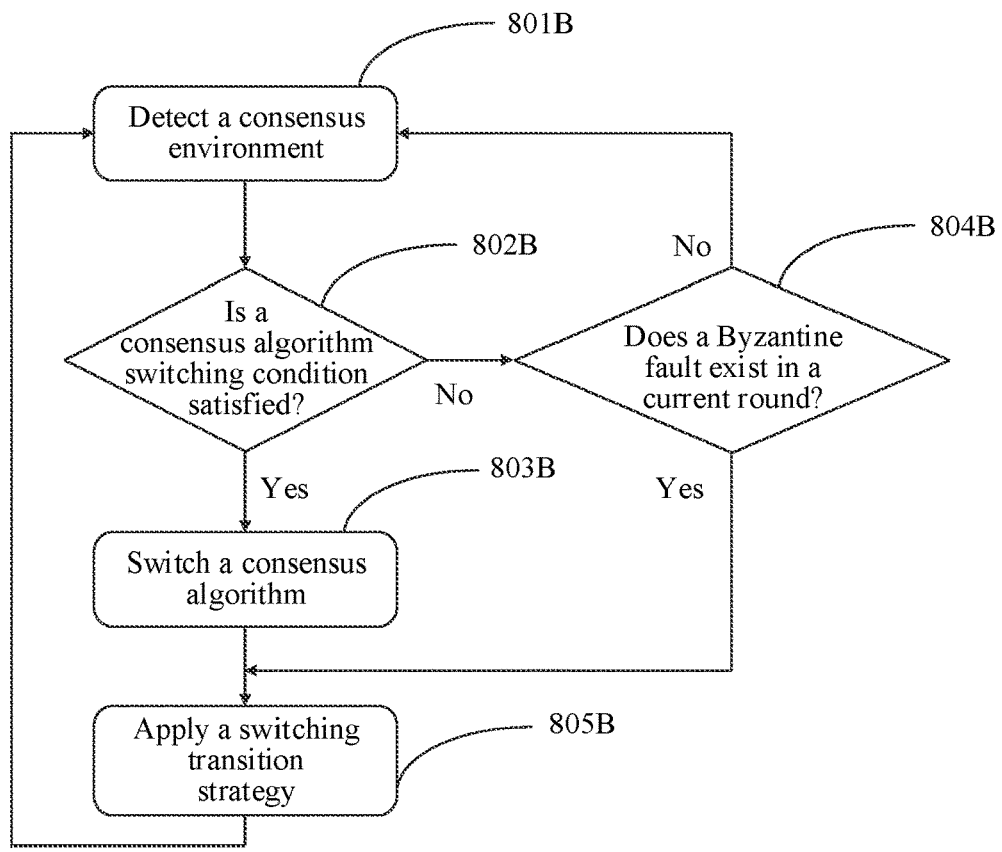
Figure 8C:
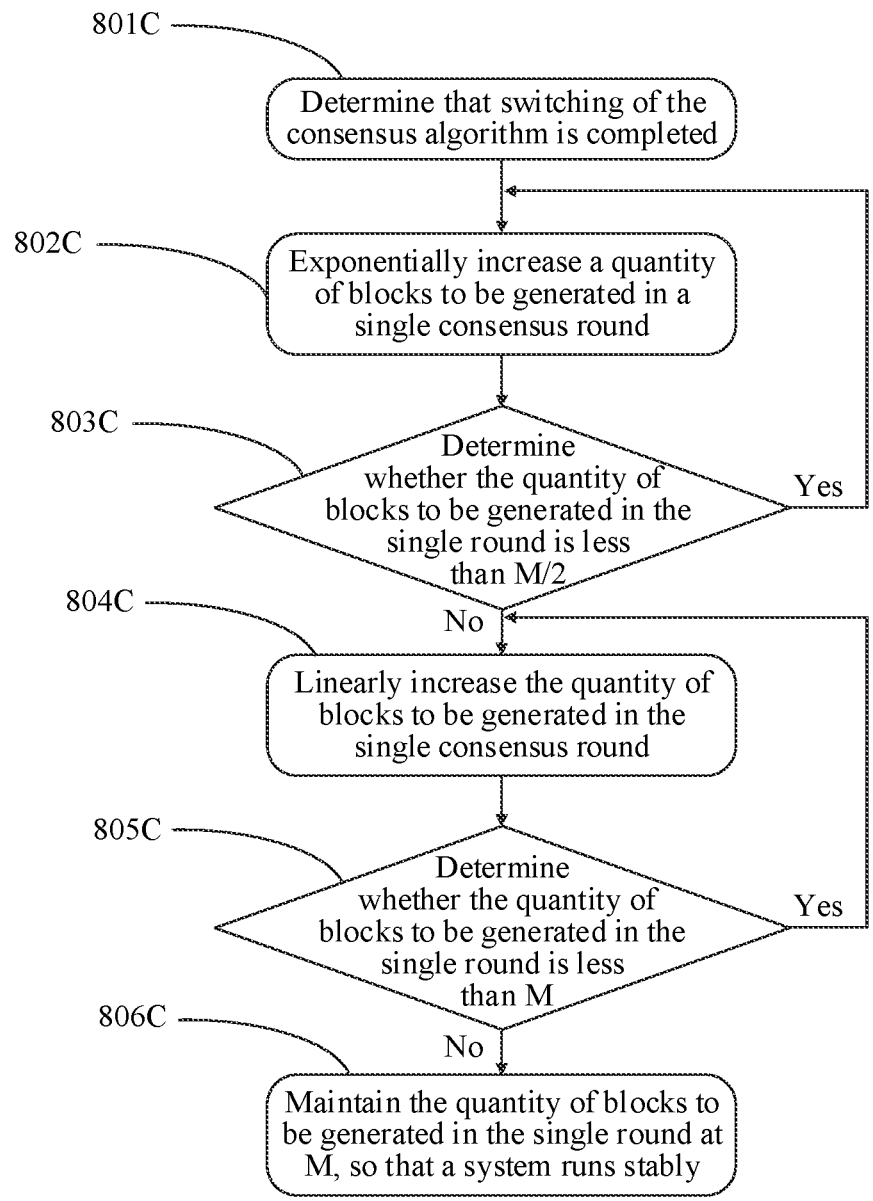

Exemplarily, FIG. 8C is a schematic flowchart of a consensus processing method for a blockchain according to an embodiment of this disclosure. Step 804A may be implemented through step 801C to step 806C.

Step 801C: Determine that switching of the consensus algorithm is completed.

Exemplarily, when the nodes in the blockchain network use the same consensus algorithm, it is determined that switching of the consensus algorithm is completed.

Step 802C: Exponentially increase a quantity of blocks to be generated in a single consensus round.

Exemplarily, in this embodiment of this disclosure, the block generation speed is zero after switching of the consensus algorithm is completed. In the switching transition strategy, the quantity of blocks to be generated in the unit time T is controlled to control the block generation speed. The unit time T is the foregoing consensus detection cycle. The block generation speed may be represented as a quantity of blocks generated in the unit time. It is assumed that one consensus detection round (each consensus detection round corresponds to one consensus detection) lasts for the unit time T. A quantity of blocks to be generated in each consensus detection round is represented by N. The quantity of blocks to be generated in a $k^{th}$ consensus detection round is $N_k$, k being greater than or equal to 1. Each time the switching transition strategy is applied, the consensus detection round is re-counted. That is to say, an initial value of the consensus detection round during each application of the switching transition strategy is k=1. In case of the current consensus algorithm, a maximum quantity of blocks to be generated in the single consensus detection round is M. A calculation manner of $N_k$ is shown in formula (1). An initial value of $N_k$ is $N_k=0$, $N_k=1$, and $N_k$ is a quantity of blocks generated in a previous consensus detection round.

$$N_k = \begin{cases} 1 & N_{k-1} = 0 \\ 2^k & N_{k-1} < M/2 \\ N_{k-1} + 1 & M/2 \leq N_{k-1} < M \\ M & N_{k-1} = M \end{cases} \quad \#(1)$$

The above calculations of $N_k$ correspond to three stages: slow block generation (implemented through step 802C, and corresponding to the range $N_{k-1}<M/2$), loss avoidance (implemented through step 804C, and corresponding to the range $M/2 \leq N_{k-1}<M$), and stable running (implemented through step 806C, and corresponding to the range $N_{k-1}=M$). The slow block generation corresponds to step 802C. When the quantity of blocks to be generated in the single consensus detection round (the time T) is less than M/2 (the block generation speed is relatively small, that is, the quantity of blocks generated in the time T), blocks to be generated in each consensus detection round is controlled to grow exponentially (that is, the block generation speed grows exponentially).

Step 803C: Determine whether the quantity of blocks to be generated in the single round is less than M/2. When a result of the determination is yes, step 802C is performed. Otherwise, step 804C is performed.

Exemplarily, when the quantity of blocks to be generated in the single consensus detection round is less than M/2, the growth rate of the block generation speed is high. However, the quantity of blocks in the single consensus detection round is small. If the consensus algorithm is switched at this time, a quantity of blocks that need to be rolled back is relatively small, which can avoid excessive ineffective messages in the message processing scenario. In addition, a low block generation speed is maintained after switching, which can prevent a system crash caused by a failure of the nodes in processing a large quantity of requests.

Step 804C: Linearly increase the quantity of blocks to be generated in the single consensus round.

Exemplarily, when the quantity of blocks to be generated in the single consensus detection round is greater than or equal to M/2 and less than $$M\left(\frac{M}{2} \le N_k < M\right),$$

the growth rate of the blocks is controlled to decrease. Specifically, the quantity of blocks to be generated in each consensus detection round is controlled to grow linearly. In other words, the growth rate of the block generation speed is controlled to remain at ($N_k=N_{k-1}+1$).

Step 805C: Determine whether the quantity of blocks to be generated in the single consensus round is less than M. When a result of the determination is yes, step 804C is performed. Otherwise, step 806C is performed.

Step 806C: Maintain the quantity of blocks to be generated in the single round at M, so that the system runs stably.

Exemplarily, when the block generation speed reaches a maximum value (MIT), that is, the quantity of blocks to be generated in the single consensus detection round is M, it may be considered that the system can run stably without a need to control the block generation speed ($N_k$=M).

Exemplarily, it is assumed that M=1024, and the quantities of the blocks generated in the consensus rounds are successively 1, 4, 8, 16, . . . 512 (the speed increases exponentially from 1 to 512), 513, 514, . . . , 1024 (the speed increases uniformly from 513 to 1024, and remains at 1024 when reaching 1024).

In this embodiment of this disclosure, after switching of the consensus algorithm, the slow block generation is adopted to quickly improve the overall throughput of the system. However, since few blocks exist in the single consensus round at this time, no excessive ineffective messages are generated even if block rollback is required. When the throughput of the system (that is, the quantity of the blocks generated in the single consensus detection round) reaches a specific threshold, the loss avoidance stage is initiated. At this time, overall performance of the system can substantially support a request amount in the system. Therefore, the growth rate of the block generation speed is reduced, to avoid generation of excessive blocks as a result of an exponential growth of the block generation speed, thereby avoiding generation of a large quantity of ineffective messages as a result of block rollback. When the system performance reaches the maximum value, the block generation speed does not need to be limited, and the system enters a stable running stage.

When a current consensus algorithm is the crash fault tolerance consensus algorithm, FIG. 8B is a flowchart of a consensus processing method for a blockchain according to an embodiment of this disclosure. Details are described below.

Step 801B: Detect a consensus environment.

Exemplarily, for execution of step 801B, reference may be made to step 801A.

Step 802B: Determine whether a consensus algorithm switching condition is satisfied. When a result of the determination is yes, step 803C is performed. Otherwise, step 804C is performed.

Exemplarily, the consensus algorithm switching condition corresponding to the crash fault tolerance consensus algorithm is: if a proportion of Byzantine nodes in a consensus process is greater than $$\left(P - \frac{2}{3}\right),$$

the consensus algorithm is switched. P is a proportion of a quantity of messages received by the master node from different nodes and the total quantity of the nodes in the consensus process. It is assumed that (1−P) nodes in the other nodes that do not receive the messages are Byzantine nodes. If a quantity of Byzantine nodes detected in a consensus process is greater than $$\left(P - \frac{2}{3}\right),$$

a total proportion of Byzantine nodes in the network is greater than $$\left(1 - P + P - \frac{2}{3}\right),$$

that is, greater than ⅓, and it indicates that Byzantine nodes of a quantity greater than a quantity that the Byzantine fault tolerance consensus algorithm can tolerate occur. In order to achieve the overall Byzantine fault tolerance capability of the system, when the proportion of the Byzantine nodes is greater than $$\left(P - \frac{2}{3}\right),$$

the consensus algorithm is switched to the Byzantine fault tolerance consensus algorithm to prevent a system abnormality caused by further malicious behaviors of the Byzantine nodes.

Step 803B: Switch the consensus algorithm.

Exemplarily, when the current consensus algorithm is the crash fault tolerance consensus algorithm, since the system (the blockchain network) has already reached the consensus in presence of the Byzantine fault, the blocks in the current detection cycle are rolled back, and then the consensus algorithm is switched to the Byzantine fault tolerance consensus algorithm.

Step 804B: Determine whether a Byzantine fault exists in a current round. When a result of the determination is yes, step 805B is performed. Otherwise, step 801B is performed.

Exemplarily, if nodes with the Byzantine fault are detected, but a consensus algorithm switch threshold is not reached, a switching transition strategy is performed. The block generation speed is reduced, to avoid rollback of excessive blocks during switching of the consensus algorithm.

Step 805B: Apply a switching transition strategy.

Exemplarily, step 805B may be implemented through step 801C to step 806C. Details are not described herein.

The consensus processing method provided in the embodiments of this disclosure is described below with reference to a federated learning scenario in the field of artificial intelligence.

A user A, a user B, and a user C are performing a federated learning task for an item recommendation model. The user A has a first part of training data for the item recommendation model. The user B has a second part of the training data for the item recommendation model. The user C has a third part of the training data for the item recommendation model. The first part of the training data, the second part of the training data, and the third part of the training data are configured as complete training data of the item recommendation model.

The user A initiates, to the blockchain network through a terminal device (a client running the blockchain network), a request to train the item recommendation model based on the first part of the training data. The user B initiates, to the blockchain network through the terminal device (the client running the blockchain network), a request to train the item recommendation model based on the second part of the training data. The user C initiates, to the blockchain network through the terminal device (the client running the blockchain network), a request to train the item recommendation model based on the third part of the training data.

The nodes in the blockchain network function as training devices, which train the item recommendation model through the above training data by using a federated learning algorithm. During the training, messages carrying parameters of the item recommendation model in each node need to be unanimously approved by the other nodes through the consensus algorithm, only after which the nodes are configured to update the item recommendation model. In this way, reliability of model updating is ensured.

The nodes in the blockchain network adopt the consensus algorithm of the first type by default to achieve higher consensus performance than the consensus algorithm of the second type. During the training, each node further performs consensus environment detection. If a detection result indicates that at least some nodes have an error during consensus processing on the message based on the consensus algorithm, it indicates that unstable factors are brought into the blockchain network (for example, network communication quality jitter, and addition of malicious nodes), and the consensus algorithm is switched to the consensus algorithm of the second type. Since the consensus algorithm of the second type has higher fault tolerance performance than the consensus algorithm of the first type, a reliable consensus on the parameters for the item recommendation model can be ensured, and erroneous parameters are prevented from being brought into the item recommendation model, thereby ensuring accurate and reliable updating of the item recommendation model.

Through the consensus processing method for a blockchain network provided in the embodiments of this disclosure, the blockchain network can switch to the crash fault tolerance consensus algorithm when no Byzantine nodes exist in a network environment, thereby satisfying an application scenario with a requirement for high performance. When a specific quantity of Byzantine nodes are detected in the system, the consensus algorithm is switched to the Byzantine fault tolerance consensus algorithm, thereby providing a higher fault tolerance capability. The switching transition strategy provided in this disclosure can reduce negative impact of a consensus performance change and a fault tolerance loss during switching of the consensus algorithm. Through the consensus processing solution provided in the embodiments of this disclosure, the consensus algorithm can be adaptively switched based on a change of a service scenario, which can not only provide a higher fault tolerance capability, but also satisfy an application scenario with a requirement for high performance.

An exemplary structure of a consensus processing apparatus 655 for a blockchain network provided in the embodiments of this disclosure implemented as a software module is described below. In some embodiments, as shown in FIG. 3, the blockchain network includes a plurality of nodes. At least some of the plurality of nodes are configured to perform consensus processing on the message transmitted by the client based on the consensus algorithm. The consensus processing apparatus 655 for a blockchain network stored in a memory 650 may include the following software modules: a data acquisition blockchain module 6551, configured to obtain a type of the consensus algorithm currently running in the blockchain network; a consensus detection blockchain module 6552, configured to perform consensus environment detection on the blockchain network to obtain a detection result in response to the blockchain network satisfying a consensus environment detection condition, the detection result indicating whether an error occurs during consensus processing of the message by the at least some nodes based on the consensus algorithm; a consensus switching blockchain module 6553, configured to switch the consensus algorithm currently running in the blockchain network to a consensus algorithm of another type in response to the detection result satisfying a consensus algorithm switching condition corresponding to the type. The type of the consensus algorithm includes a first type and a second type, consensus performance of a consensus algorithm of the first type is greater than consensus performance of a consensus algorithm of the second type, and fault tolerance performance of the consensus algorithm of the second type is greater than fault tolerance performance of the consensus algorithm of the first type.

In some embodiments, when the blockchain network currently runs the consensus algorithm of the second type, the detection result includes a quantity of erroneous nodes in the blockchain network within one or more detection cycles. The erroneous nodes are nodes that transmit an erroneous consensus response message for the message. The consensus switching blockchain module 6553 is configured to switch the consensus algorithm of the second type currently running in the blockchain network to the consensus algorithm of the first type in response to a quantity of the erroneous nodes detected in the blockchain network within one or more detection cycles being less than or equal to a consensus proportion threshold.

In some embodiments, when the blockchain network currently runs the consensus algorithm of the first type, the detection result includes a quantity of normal nodes and a quantity of erroneous nodes in the blockchain network. The normal nodes are nodes without an operation fault, and the erroneous nodes are nodes with an operation fault. The consensus switching blockchain module 6553 is configured to: determine a proportion of the erroneous nodes based on a total quantity of nodes in the blockchain network and the quantity of the erroneous nodes, and determine a proportion of the normal nodes based on the total quantity of the nodes and the quantity of the normal nodes; perform, in response to the proportion of the erroneous nodes being equal to or greater than a global-dimension fault tolerance proportion threshold corresponding to the consensus algorithm of the second type, rollback on a block on which the erroneous nodes reach a consensus, the global-dimension fault tolerance proportion threshold being a difference between the proportion of the normal nodes and a preset fault tolerance proportion; and switch the consensus algorithm of the first type currently running in the blockchain network to the consensus algorithm of the second type.

In some embodiments, when the blockchain network currently runs the consensus algorithm of the first type, the detection result includes a quantity of erroneous nodes in the blockchain network corresponding to each access party, a different access party corresponding to a different node, and the erroneous nodes being nodes with an operation fault. The consensus switching blockchain module 6553 is configured to: determine a proportion of the erroneous nodes corresponding to each access party based on a total quantity of nodes and the quantity of the erroneous nodes corresponding to each access party; and switch the consensus algorithm of the first type currently running in the blockchain network to the consensus algorithm of the second type in response to the proportion of the erroneous nodes in the blockchain network corresponding to at least one access party being greater than an access-party-dimension fault tolerance proportion threshold.

In some embodiments, the plurality of nodes belong to a plurality of types. When the blockchain network currently runs the consensus algorithm of the first type, the detection result includes a quantity of erroneous nodes of each type in the blockchain network, the erroneous nodes being nodes with an operation fault. The consensus switching blockchain module 6553 is configured to: determine a proportion of the erroneous nodes of each type based on a total quantity of nodes and the quantity of the erroneous nodes of each type; and switch the consensus algorithm of the first type currently running in the blockchain network to the consensus algorithm of the second type in response to a proportion of erroneous nodes of at least one type in the blockchain network being greater than a node-dimension fault tolerance proportion threshold.

In some embodiments, the plurality of nodes in the blockchain network are located in a plurality of network segments. The detection result includes a quantity of erroneous nodes in each network segment in the blockchain network, the erroneous nodes being nodes with an operation fault. When the blockchain network currently runs the consensus algorithm of the first type, the consensus switching blockchain module 6553 is configured to: determine a proportion of the erroneous nodes in each network segment based on a total quantity of nodes and the quantity of the erroneous nodes in each network segment; and switch the consensus algorithm of the first type currently running in the blockchain network to the consensus algorithm of the second type in response to a proportion of erroneous nodes in at least one network segment in the blockchain network being greater than a network-segment-dimension fault tolerance proportion threshold.

In some embodiments, when the blockchain network currently runs the consensus algorithm of the first type, the consensus switching blockchain module 6553 is configured to control a block generation speed of the blockchain network in response to erroneous nodes existing in the blockchain network and a proportion of the erroneous nodes being less than a fault tolerance proportion threshold corresponding to the consensus algorithm of the second type. The erroneous nodes are nodes with an operation fault, and a type of the fault tolerance proportion threshold includes a global-dimension fault tolerance proportion threshold, an access-party-dimension fault tolerance proportion threshold, a node-dimension fault tolerance proportion threshold, and a network-segment-dimension fault tolerance proportion threshold.

In some embodiments, the consensus switching blockchain module 6553 is configured to control a block generation speed of the blockchain network.

In some embodiments, the consensus switching blockchain module 6553 is configured to: determine a block generation speed of the blockchain network in at least one historical detection cycle, and determine a target speed range where the block generation speed is located from a plurality of speed ranges, endpoint speeds of the plurality of speed ranges being linked with each other in sequence; and control the block generation speed of the blockchain network in a current detection cycle based on a speed control manner corresponding to the target speed range, a different speed range corresponding to a different speed control manner.

In some embodiments, the consensus switching blockchain module 6553 is configured to obtain a maximum block generation speed of the blockchain network, and determine a speed threshold based on the maximum block generation speed and a speed proportion threshold; and use zero as a first speed range, a range between zero and the speed threshold as a second speed range, a range greater than or equal to the speed threshold and less than the maximum block generation speed as a third speed range, and a range equal to the maximum block generation speed as a fourth speed range. A speed control manner corresponding to the first speed range is controlling the block generation speed to remain at a minimum block generation speed, a speed control manner corresponding to the second speed range is controlling the block generation speed to grow exponentially, a speed control manner corresponding to the third speed range is controlling the block generation speed to grow uniformly, and a speed control manner corresponding to the fourth speed range is controlling the block generation speed to remain at the maximum block generation speed.

In some embodiments, the consensus switching blockchain module 6553 is configured to: obtain a maximum block generation speed of a block of the blockchain network; and divide a range between the maximum block generation speed and zero into a plurality of speed ranges linked with each other in sequence. A speed value corresponding to each of the speed ranges is negatively correlated with a speed growth rate corresponding to a speed control manner for each speed range.

In some embodiments, the consensus switching blockchain module 6553 is configured to: detect blocks generated in the blockchain network in at least one recent detection cycle to obtain parameters of the plurality of nodes, the parameters including at least one of a type of each of the nodes, an access party corresponding to each node, and a network segment corresponding to each node; determine each node performing consensus processing within the at least one detection cycle, and verify a consensus response message signature of each node to obtain a verification result of each node, a verification result of the node with a correct consensus response message signature being a correct node, and a verification result of the node with an erroneous consensus response message signature being an erroneous node; and use the verification result of each node and at least one of the parameters as the detection result.

In some embodiments, the consensus environment detection condition includes at least one of: a new node accesses the blockchain network; a load of at least one of the nodes in the blockchain network exceeds a node load threshold; a load corresponding to at least one access party in the blockchain network exceeds a load threshold; and a quantity of nodes corresponding to at least one network segment in the blockchain network exceeds a node load quantity threshold of the network segment.

In some embodiments, the consensus detection blockchain module 6552 is configured to: perform signature processing on the message in response to the message being transmitted to each of the nodes; and determine, in response to a proportion of a quantity of normal nodes in the blockchain network to a total quantity of nodes being greater than or equal to a response proportion threshold and a proportion of effective consensus response messages in consensus response messages of the normal nodes being greater than an effective proportion threshold, that a consensus is reached on the message based on the consensus algorithm of the first type, the normal nodes being nodes making a response to the messages, and signatures of the effective consensus response messages being effective signatures.

An embodiment of this disclosure provides a computer program product or a computer program, the computer program product or the computer program including computer instructions, the computer instructions being stored in a computer-readable storage medium. A processor of a computer device reads the computer instructions from a computer-readable storage medium, and the processor executes the computer instructions, so that the computer device performs the foregoing consensus processing method for a blockchain network in the embodiments of this disclosure.

An embodiment of this disclosure provides a non-transitory computer-readable storage medium storing executable instructions, the executable instructions, when executed by a processor, causing the processor to perform the consensus processing method for a blockchain network provided in the embodiments of this disclosure, for example, the consensus processing method for a blockchain network shown in any one of FIG. 4A to FIG. 4F and FIG. 5A to FIG. 5C.

In some embodiments, the computer-readable storage medium may be a memory such as a FRAM, a ROM, a PROM, an EPROM, an EEPROM, a flash memory, a magnetic surface memory, a compact disc, or a CD-ROM; or may be various devices including one or any combination of the foregoing memories.

In some embodiments, the executable instructions may adopt any form such as a program, a software, a software module, a script, or a code, may be written in a programming language of any form (including a compiled or interpreted language, or a declarative or procedural language), and may be deployed in any form, for example, deployed as a standalone program or as a module, a component, a subroutine, or another unit suitable for use in a computing environment.

In an example, the executable instructions may be deployed to be executed on one computing device, on a plurality of computing devices located at one site, or on a plurality of computing devices distributed at a plurality of locations and connected by a communication network.

In summary, in the embodiment of this disclosure, when the consensus environment detection condition is satisfied, the consensus algorithm of the blockchain network is switched based on the switching condition corresponding to the consensus detection result and the consensus algorithm, which realizes more flexible consensus algorithm switching for the blockchain network, so that the consensus algorithm can satisfy a fault tolerance requirement of the blockchain network more effectively, thereby improving a fault tolerance capability and operation stability of the blockchain network. Controlling the block generation speed after switching of the consensus algorithm can reduce negative impact of a consensus performance change and a fault tolerance loss during switching of the consensus algorithm. Through the consensus processing solution provided in the embodiments of this disclosure, the consensus algorithm can be adaptively switched based on a change of a service scenario, which can not only provide a higher fault tolerance capability, but also satisfy an application scenario with a requirement for high performance.

The foregoing descriptions are merely the embodiments of this disclosure and are not intended to limit the protection scope of this disclosure. Any modification, equivalent replacement, or improvement made without departing from the spirit and principle of this disclosure falls within the protection scope of this disclosure.

What is claimed is:

1. A consensus processing method for a blockchain network, performed by an electronic device, the electronic device running a plurality of nodes comprised in the blockchain network, and at least some of the plurality of nodes being configured to perform consensus processing on a message transmitted by a client based on a consensus algorithm, the method comprising:

obtaining a type of the consensus algorithm currently running in the blockchain network, the type of the consensus algorithm comprising a first type and a second type, consensus performance of a consensus algorithm of the first type being greater than consensus performance of a consensus algorithm of the second type, and fault tolerance performance of the consensus algorithm of the second type being greater than fault tolerance performance of the consensus algorithm of the first type;

performing consensus environment detection on the blockchain network to obtain a detection result in response to the blockchain network satisfying a consensus environment detection condition, the detection result indicating whether an error occurs during consensus processing of the message by at least some nodes based on the consensus algorithm;

switching the consensus algorithm currently running in the blockchain network to a consensus algorithm of another type in response to the detection result satisfying a consensus algorithm switching condition corresponding to the type of the consensus algorithm;

wherein the detection result comprises a quantity of normal nodes and a quantity of erroneous nodes in the blockchain network, the normal nodes are nodes without an operation fault, and the erroneous nodes are nodes with an operation fault, and in response to the blockchain network running the consensus algorithm of the first type, the switching the consensus algorithm currently running in the blockchain network to the consensus algorithm of the another type comprises:

determining a proportion of the erroneous nodes based on a total quantity of nodes in the blockchain network and the quantity of the erroneous nodes, and determining a proportion of the normal nodes based on the total quantity of the nodes and the quantity of the normal nodes;

in response to the proportion of the erroneous nodes being equal to or greater than a global-dimension fault tolerance proportion threshold corresponding to the consensus algorithm of the second type, performing rollback on a block on which the erroneous nodes reach a consensus, the global-dimension fault tolerance proportion threshold being a difference between the proportion of the normal nodes and a preset fault tolerance proportion; and switching the consensus algorithm of the first type currently running in the blockchain network to the consensus algorithm of the second type.

2. The method according to claim 1, wherein the blockchain network currently runs the consensus algorithm of the second type, the detection result comprises a quantity of erroneous nodes in the blockchain network within one or more detection cycles, the erroneous nodes are nodes that transmit an erroneous consensus response message for the message, and the switching the consensus algorithm currently running in the blockchain network to the consensus algorithm of the another type comprises:

switching the consensus algorithm of the second type currently running in the blockchain network to the consensus algorithm of the first type in response to a quantity of the erroneous nodes detected in the blockchain network within one or more detection cycles being less than or equal to a consensus proportion threshold.

3. The method according to claim 1, wherein the blockchain network currently runs the consensus algorithm of the first type, the detection result comprises a quantity of erroneous nodes in the blockchain network corresponding to each access party, a different access party corresponds to a different node, and the erroneous nodes are nodes with an operation fault, and the switching the consensus algorithm currently running in the blockchain network to the consensus algorithm of the another type comprises:

determining a proportion of the erroneous nodes corresponding to each access party based on a total quantity of nodes and the quantity of the erroneous nodes corresponding to each access party; and switching the consensus algorithm of the first type currently running in the blockchain network to the consensus algorithm of the second type in response to the proportion of the erroneous nodes in the blockchain network corresponding to at least one access party being greater than an access-party-dimension fault tolerance proportion threshold.

4. The method according to claim 1, wherein the plurality of nodes belong to a plurality of types, the blockchain network currently runs the consensus algorithm of the first type, the detection result comprises a quantity of erroneous nodes of each type in the blockchain network, the erroneous nodes are nodes with an operation fault, and the switching the consensus algorithm currently running in the blockchain network to the consensus algorithm of the another type comprises:

determining a proportion of the erroneous nodes of each type based on a total quantity of nodes and the quantity of the erroneous nodes of each type; and switching the consensus algorithm of the first type currently running in the blockchain network to the consensus algorithm of the second type in response to a proportion of erroneous nodes of at least one type in the blockchain network being greater than a node-dimension fault tolerance proportion threshold.

5. The method according to claim 1, wherein the plurality of nodes in the blockchain network are located in a plurality of network segments, the blockchain network currently runs the consensus algorithm of the first type, the detection result comprises a quantity of erroneous nodes in each of the plurality of network segments in the blockchain network, the erroneous nodes are nodes with an operation fault; and the switching the consensus algorithm currently running in the blockchain network to the consensus algorithm of the another type comprises:

determining a proportion of the erroneous nodes in each of the plurality of network segments based on a total quantity of nodes and the quantity of the erroneous nodes in the each network segment; and switching the consensus algorithm of the first type currently running in the blockchain network to the consensus algorithm of the second type in response to a proportion of erroneous nodes in at least one network segment in the blockchain network being greater than a network-segment-dimension fault tolerance proportion threshold.

6. The method according to claim 1, wherein the blockchain network currently runs the consensus algorithm of the first type, and the method further comprises:

controlling a block generation speed of the blockchain network in response to erroneous nodes existing in the blockchain network and a proportion of the erroneous nodes being less than a fault tolerance proportion threshold corresponding to the consensus algorithm of the second type, the erroneous nodes being nodes with an operation fault, and the fault tolerance proportion threshold comprising at least one of: a global-dimension fault tolerance proportion threshold, an access-party-dimension fault tolerance proportion threshold, a node-dimension fault tolerance proportion threshold, or a network-segment-dimension fault tolerance proportion threshold.

7. The method according to claim 1, wherein the method further comprises:

controlling a block generation speed of the blockchain network.

8. The method according to claim 7, wherein the controlling the block generation speed of the blockchain network comprises:

determining a block generation speed of the blockchain network in at least one historical detection cycle, and determining a target speed range where the block generation speed is located from a plurality of speed ranges, endpoint speeds of the plurality of speed ranges being linked with each other in sequence; and controlling the block generation speed of the blockchain network in a current detection cycle based on a speed control manner corresponding to the target speed range, a different speed range corresponding to a different speed control manner.

9. The method according to claim 8, wherein the method further comprises:

obtaining a maximum block generation speed of the blockchain network, and determining a speed threshold based on the maximum block generation speed and a speed proportion threshold; and using zero as a first speed range, a range between zero and the speed threshold as a second speed range, a range greater than or equal to the speed threshold and less than the maximum block generation speed as a third speed range, and a range equal to the maximum block generation speed as a fourth speed range, a speed control manner corresponding to the first speed range being controlling the block generation speed to remain at a minimum block generation speed, a speed control manner corresponding to the second speed range being controlling the block generation speed to grow exponentially, a speed control manner corresponding to the third speed range being controlling the block generation speed to grow uniformly, and a speed control manner corresponding to the fourth speed range being controlling the block generation speed to remain at the maximum block generation speed.

10. The method according to claim 8, wherein the method further comprises:
obtaining a maximum block generation speed of a block of the blockchain network; and
dividing a range between the maximum block generation speed and zero into a plurality of speed ranges linked with each other in sequence, a speed value corresponding to each of the speed ranges being negatively correlated with a speed growth rate corresponding to a speed control manner for the each speed range.

11. The method according to claim 1, wherein the performing the consensus environment detection on the blockchain network to obtain the detection result comprises:
detecting blocks generated in the blockchain network in at least one recent detection cycle to obtain parameters of the plurality of nodes, the parameters comprising at least one of: a type of a node, an access party corresponding to a node, or a network segment corresponding to a node;
determining nodes performing consensus processing within the at least one detection cycle, and verifying a consensus response message signature of each of the nodes to obtain a verification result of the each node, a verification result of a node with a correct consensus response message signature being a correct node, and a verification result of a node with an erroneous consensus response message signature being an erroneous node; and
using the verification result of the each node and at least one of the parameters as the detection result.

12. The method according to claim 1, wherein the consensus environment detection condition comprises at least one of:
a new node accesses the blockchain network;
a load of at least one of the nodes in the blockchain network exceeds a node load threshold;
a load corresponding to at least one access party in the blockchain network exceeds a load threshold; and
a quantity of nodes corresponding to at least one network segment in the blockchain network exceeds a node load quantity threshold of the network segment.

13. The method according to claim 1, wherein the blockchain network currently runs the consensus algorithm of the first type, the method further comprises:
performing signature processing on the message in response to the message being transmitted to each of the nodes; and
in response to a proportion of a quantity of normal nodes in the blockchain network to a total quantity of nodes being greater than or equal to a response proportion threshold and a proportion of effective consensus response messages in consensus response messages of the normal nodes being greater than an effective proportion threshold, determining that a consensus is reached on the message based on the consensus algorithm of the first type, the normal nodes being nodes making a response to the messages, and signatures of the effective consensus response messages being effective signatures.

14. A consensus processing method for a blockchain network, the blockchain network comprising a plurality of nodes, and at least some of the plurality of nodes being configured to perform consensus processing on a message transmitted by a client based on a consensus algorithm; and the method comprising:
determining a block generation speed of the blockchain network in at least one historical detection cycle;
determining a plurality of speed ranges based on a maximum block generation speed in the blockchain network;
determining a target speed range where the block generation speed is located from the plurality of speed ranges, endpoint speeds of the plurality of speed ranges being linked with each other in sequence; and
controlling the block generation speed of the blockchain network in a current detection cycle based on a speed control manner corresponding to the target speed range, a different speed range corresponding to a different speed control manner.

15. The method according to claim 14, wherein the determining the plurality of speed ranges comprises:
obtaining a maximum block generation speed of the blockchain network, and determining a speed threshold based on the maximum block generation speed and a speed proportion threshold; and
using zero as a first speed range, a range between zero and the speed threshold as a second speed range, a range greater than or equal to the speed threshold and less than the maximum block generation speed as a third speed range, and a range equal to the maximum block generation speed as a fourth speed range,
a speed control manner corresponding to the first speed range being controlling the block generation speed to remain at a minimum block generation speed, a speed control manner corresponding to the second speed range being controlling the block generation speed to grow exponentially, a speed control manner corresponding to the third speed range being controlling the block generation speed to grow uniformly, and a speed control manner corresponding to the fourth speed range being controlling the block generation speed to remain at the maximum block generation speed.

16. The method according to claim 14, wherein the determining the plurality of speed ranges comprises:
obtaining a maximum block generation speed of a block of the blockchain network; and
dividing a range between the maximum block generation speed and zero into a plurality of speed ranges linked with each other in sequence, a speed value corresponding to each of the speed ranges being negatively correlated with a speed growth rate corresponding to a speed control manner for each speed range.

17. A consensus processing apparatus for a blockchain network, the blockchain network comprising a plurality of nodes, at least some of the plurality of nodes being configured to perform consensus processing on a message transmitted by a client based on a consensus algorithm, and the consensus processing apparatus comprising:
a memory operable to store computer-readable instructions; and
a processor circuitry operable to read the computer-readable instructions, the processor circuitry when executing the computer-readable instructions is configured to:
obtain a type of the consensus algorithm currently running in the blockchain network, the type of the consensus algorithm comprising a first type and a second type, consensus performance of a consensus algorithm of the first type being greater than consensus performance of a consensus algorithm of the second type, and fault tolerance performance of the consensus algorithm of the second type being greater than fault tolerance performance of the consensus algorithm of the first type;

perform consensus environment detection on the blockchain network to obtain a detection result in response to the blockchain network satisfying a consensus environment detection condition, the detection result indicating whether an error occurs during consensus processing of the message by the at least some nodes based on the consensus algorithm;

switch the consensus algorithm currently running in the blockchain network to a consensus algorithm of another type in response to the detection result satisfying a consensus algorithm switching condition corresponding to the type of the consensus algorithm;

wherein the detection result comprises a quantity of normal nodes and a quantity of erroneous nodes in the blockchain network, the normal nodes are nodes without an operation fault, and the erroneous nodes are nodes with an operation fault, and the processor circuitry is configured to:

in response to the blockchain network running the consensus algorithm of the first type, determine a proportion of the erroneous nodes based on a total quantity of nodes in the blockchain network and the quantity of the erroneous nodes, and determine a proportion of the normal nodes based on the total quantity of the nodes and the quantity of the normal nodes;

in response to the proportion of the erroneous nodes being equal to or greater than a global-dimension fault tolerance proportion threshold corresponding to the consensus algorithm of the second type, perform rollback on a block on which the erroneous nodes reach a consensus, the global-dimension fault tolerance proportion threshold being a difference between the proportion of the normal nodes and a preset fault tolerance proportion; and switch the consensus algorithm of the first type currently running in the blockchain network to the consensus algorithm of the second type.

18. The apparatus according to claim 17, wherein the blockchain network currently runs the consensus algorithm of the second type, the detection result comprises a quantity of erroneous nodes in the blockchain network within one or more detection cycles, the erroneous nodes are nodes that transmit an erroneous consensus response message for the message, and the processor circuitry is configured to:

switch the consensus algorithm of the second type currently running in the blockchain network to the consensus algorithm of the first type in response to a quantity of the erroneous nodes detected in the blockchain network within one or more detection cycles being less than or equal to a consensus proportion threshold.

\* \* \* \* \*